US010663632B2

(12) United States Patent
Di Trapani et al.

(10) Patent No.: US 10,663,632 B2
(45) Date of Patent: May 26, 2020

(54) REFLECTIVE ILLUMINATION SYSTEMS FOR OPTICALLY WIDENED PERCEPTION

(71) Applicant: COELUX S.R.L., Lomazzo (IT)

(72) Inventors: Paolo Di Trapani, Cavallasca (IT); Davide Magatti, Capiago Intimiano (IT)

(73) Assignee: CoeLux S.r.l., Lomazzo (CO) (IT)

( * ) Notice: Subject to any disclaimer, the term of this patent is extended or adjusted under 35 U.S.C. 154(b) by 65 days.

(21) Appl. No.: 15/742,811

(22) PCT Filed: Jul. 15, 2015

(86) PCT No.: PCT/EP2015/001455
§ 371 (c)(1),
(2) Date: Jan. 8, 2018

(87) PCT Pub. No.: WO2017/008822
PCT Pub. Date: Jan. 19, 2017

(65) Prior Publication Data
US 2018/0210120 A1    Jul. 26, 2018

(51) Int. Cl.
*G02B 5/02* (2006.01)
*F21V 7/00* (2006.01)

(52) U.S. Cl.
CPC ......... *G02B 5/0284* (2013.01); *G02B 5/0215* (2013.01); *G02B 5/0221* (2013.01);
(Continued)

(58) Field of Classification Search
CPC .. G02B 5/0284; G02B 5/0215; G02B 5/0221; G02B 5/0226; G02B 5/0242;
(Continued)

(56) References Cited

U.S. PATENT DOCUMENTS 3,726,583 A * 4/1973 Fujisaki ................. G03B 21/60
359/452
6,348,995 B1 * 2/2002 Hansen ............. G02F 1/133536
349/96
(Continued)

FOREIGN PATENT DOCUMENTS

EP    1635200 A1    3/2006
EP    1919000 A1    5/2008
(Continued)

OTHER PUBLICATIONS

Standard Terminology of Appearance, ASTM International, Designation: E284-09a, downloaded Feb. 2012, pp. 1-23 (23 total pages).
(Continued)

*Primary Examiner* — Arnel C Lavarias
(74) *Attorney, Agent, or Firm* — DiBerardino McGovern IP Group LLC

(57) ABSTRACT

In an aspect, an illumination system (100) includes a light source (102) configured to generate a light beam (103), and a chromatic reflective unit (1) for being illuminated by the light beam (103). The chromatic reflective unit (1) includes a plurality of non-coplanar reflective surface sections (3'), and a chromatic diffusing layer (5) includes a plurality of nanoparticles (37) embedded in a matrix (39). The chromatic diffusing layer (5) is provided upstream of the plurality of reflective surface sections (3') such that at least a portion of the light beam (103) passes through the chromatic diffusing layer (5) before and after being reflected by the plurality of non-coplanar reflective surface sections (3'). Chromatic diffusing layer (5) is further configured to provide for a specular reflectance that is larger in the red than in the blue and for a diffuse reflectance that is larger in the blue than in the red.

29 Claims, 14 Drawing Sheets

(52) U.S. Cl.
CPC ......... G02B 5/0226 (2013.01); G02B 5/0242 (2013.01); G02B 5/0294 (2013.01); *F21V 7/0008* (2013.01)

(58) Field of Classification Search
CPC ......... G02B 5/0294; G02B 1/00; G02B 5/00; G02B 5/021; G02B 5/0231; G02B 5/0236; G02B 5/0273; G02B 5/0278; G02B 5/0289; F21V 7/0008
USPC .................................................. 359/599, 615
See application file for complete search history.

(56) References Cited

U.S. PATENT DOCUMENTS

| | | | | |
|---|---|---|---|---|
| 7,911,692 | B2* | 3/2011 | Okamoto | G03B 21/56 359/449 |
| 8,068,285 | B1 | 11/2011 | Flynn | |
| 8,400,714 | B2* | 3/2013 | Howe | G02B 5/0284 359/599 |
| 2016/0363777 | A1 | 12/2016 | Flynn et al. | |
| 2017/0074486 | A1 | 3/2017 | Flynn et al. | |
| 2018/0203165 | A1* | 7/2018 | Di Trapani | C03C 17/34 |
| 2018/0335188 | A1* | 11/2018 | Di Trapani | F21S 8/026 |
| 2018/0345630 | A1* | 12/2018 | Di Trapani | B32B 17/10036 |
| 2019/0079220 | A1* | 3/2019 | Di Trapani | C03C 17/34 |
| 2019/0178471 | A1* | 6/2019 | Di Trapani | F21V 7/0008 |

FOREIGN PATENT DOCUMENTS

| | | |
|---|---|---|
| EP | 2202454 A2 | 6/2010 |
| EP | 2221349 A1 | 8/2010 |
| EP | 2786972 A1 | 10/2014 |
| EP | 2873709 A1 | 5/2015 |
| GB | 2450192 C | 12/2005 |
| WO | 2009156347 A1 | 12/2009 |
| WO | 2009156348 A1 | 12/2009 |
| WO | 2012054318 A1 | 4/2012 |
| WO | 2013011481 A2 | 1/2013 |
| WO | 2014058748 A1 | 4/2014 |
| WO | 2014076656 A1 | 5/2014 |
| WO | 2015036057 A1 | 3/2015 |
| WO | 2015172794 A1 | 11/2015 |
| WO | 2015172821 A1 | 11/2015 |
| WO | 2016134732 A1 | 9/2016 |
| WO | 2016134733 A1 | 9/2016 |
| WO | 2017008821 A1 | 1/2017 |
| WO | 2017085079 A1 | 5/2017 |

OTHER PUBLICATIONS

Friedhelm Fensterseifer, "Reflection Haze," BYK-Gardner Catalog, 2010/2011, pp. 27-28 (2 total pages).
T.C. Greenfell et al., "Representation of a non-spherical ice particle by a collection of independent spheres for scattering and absorption of radiation," Journal of Geophysical Research, vol. 104, No. D24, pp. 31,697-31,709 (13 total pages), Dec. 27, 1999.
Charlotte Albayrak, European International Searching Authority, International Search Report and Written Opinion, counterpart PCT Application No. PCT/EP2015/001455, dated May 13, 2016, 9 pages total.

* cited by examiner

FIG 2
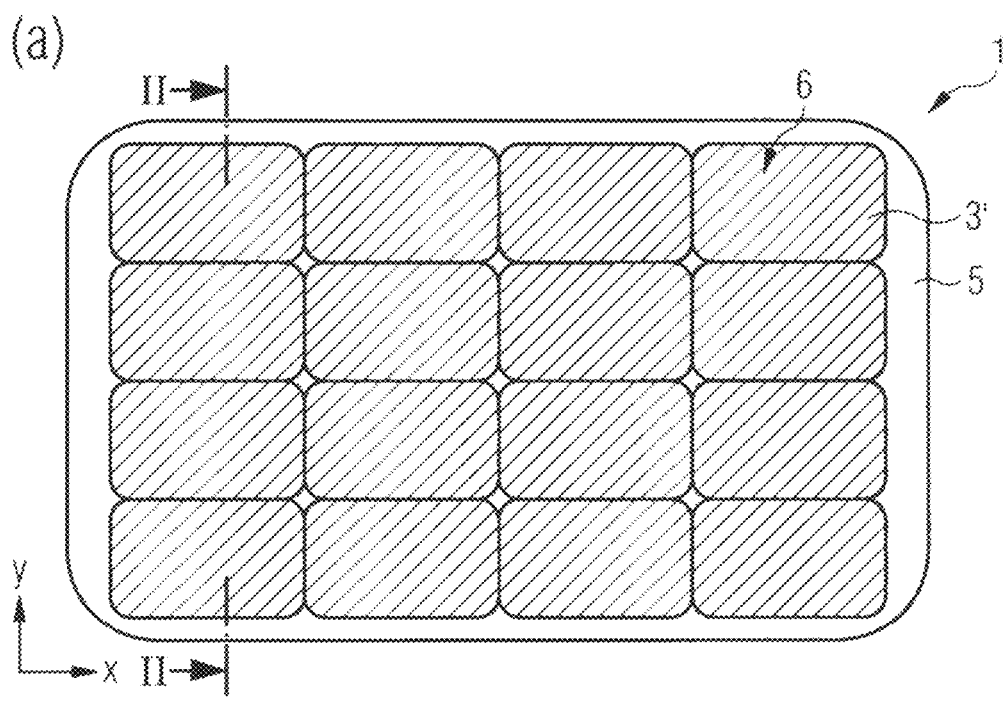
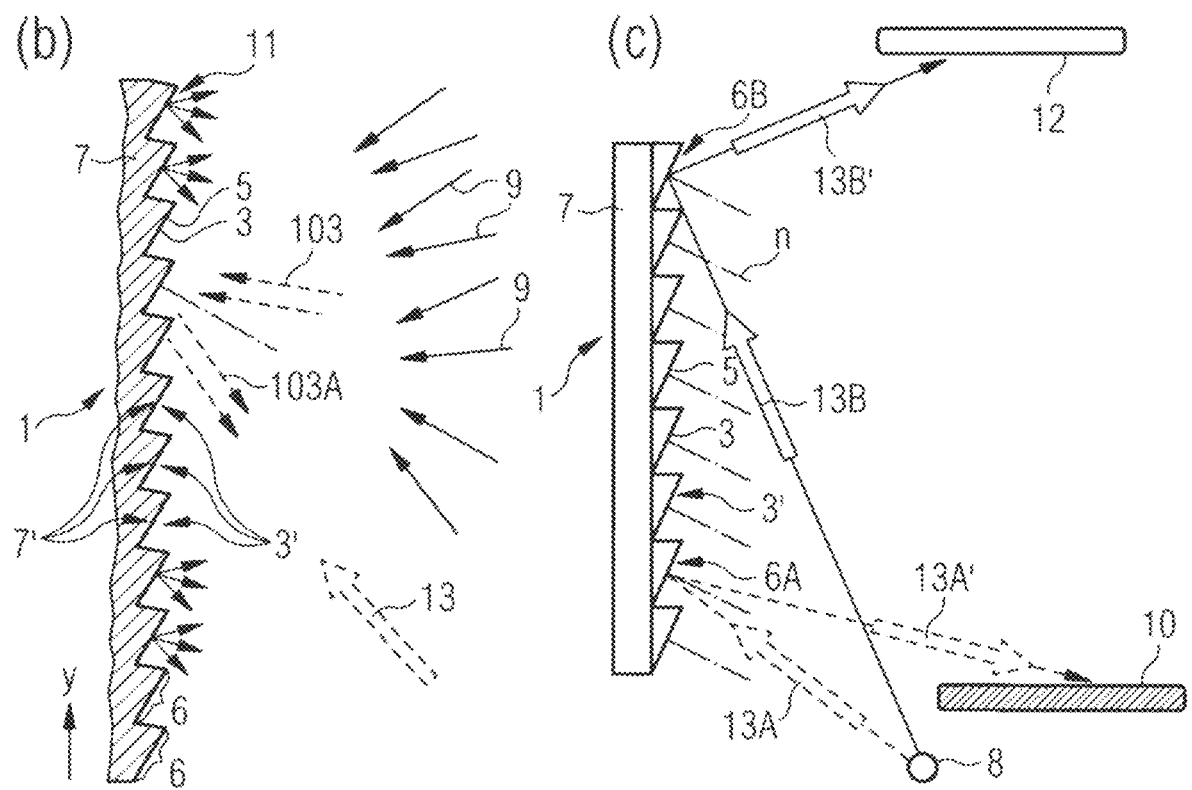

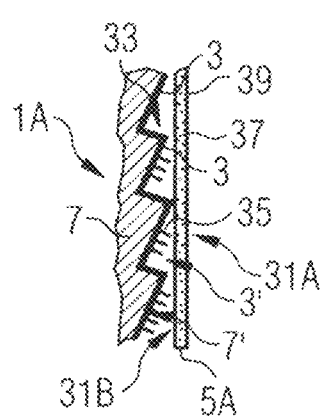
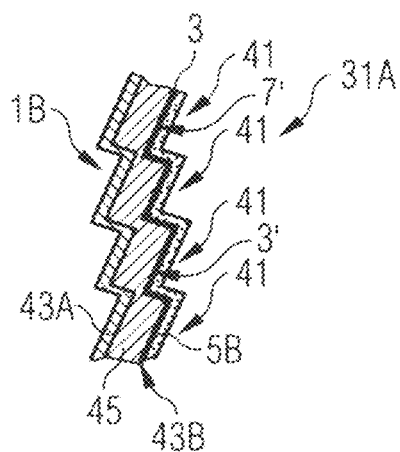
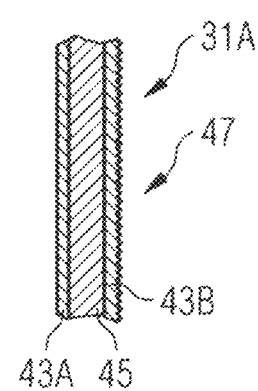
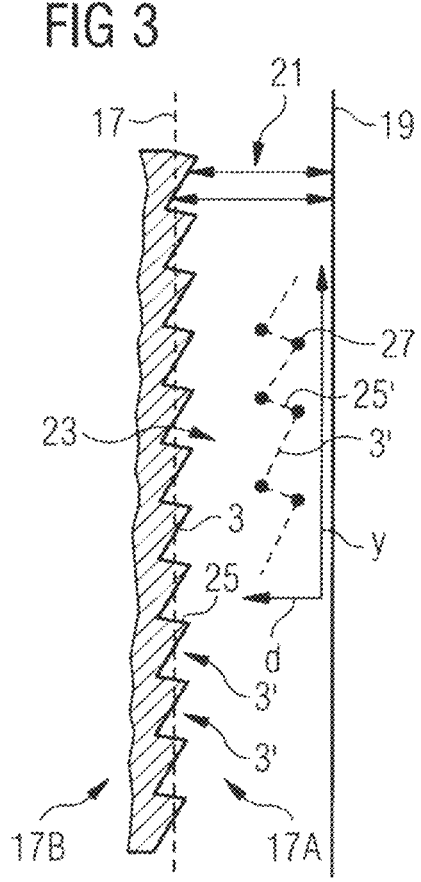
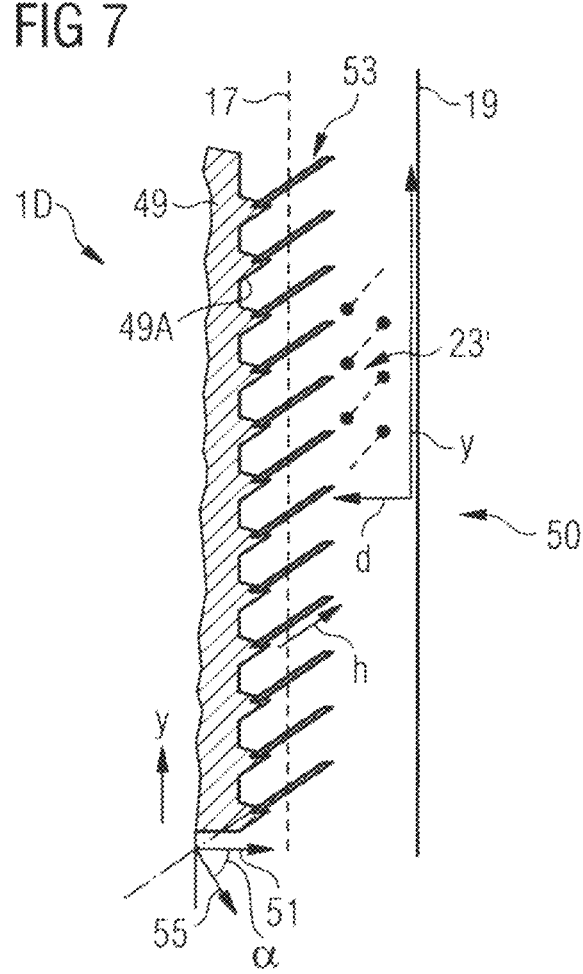

FIG 19
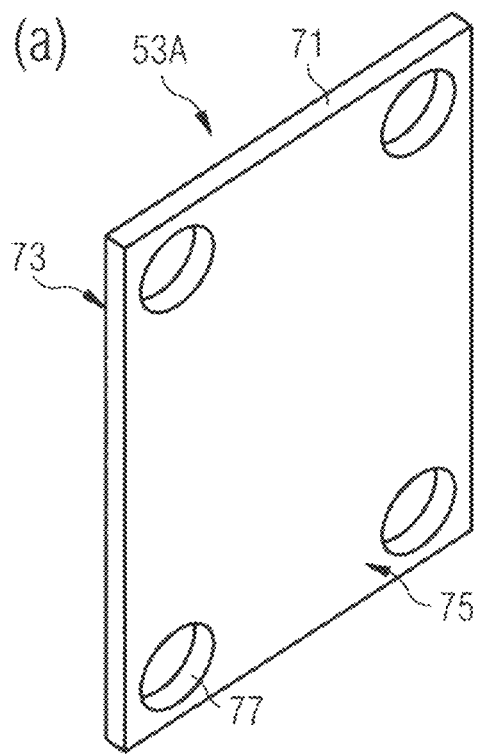
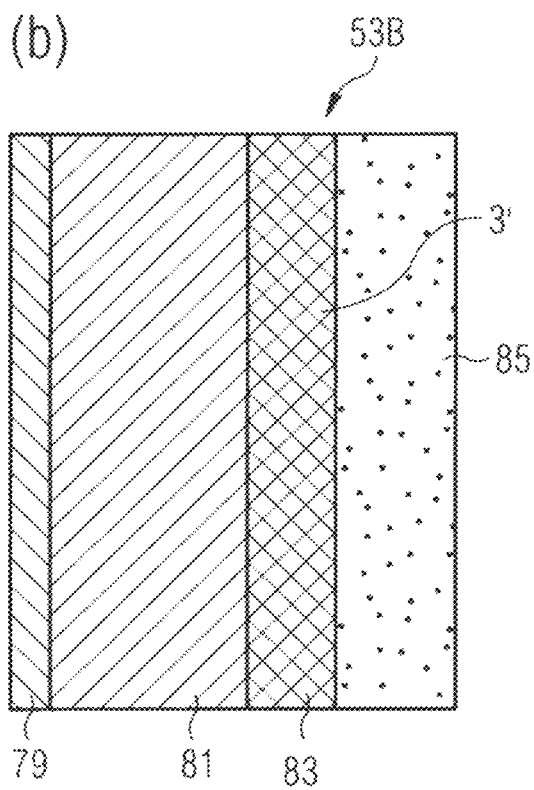

FIG 25
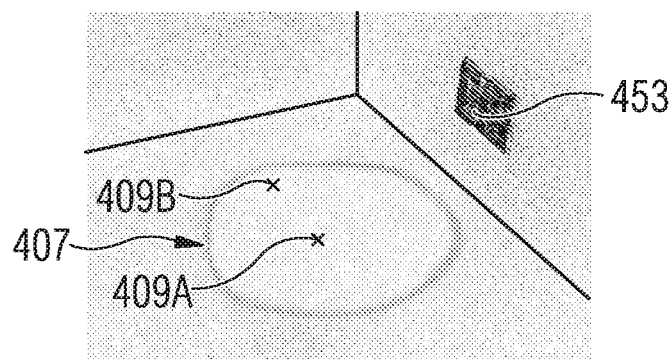
FIG 26
(a)
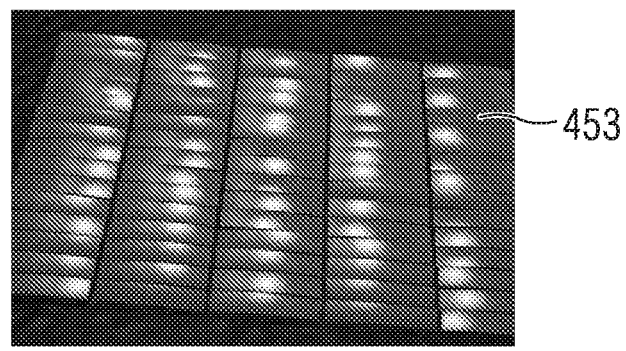
(b)
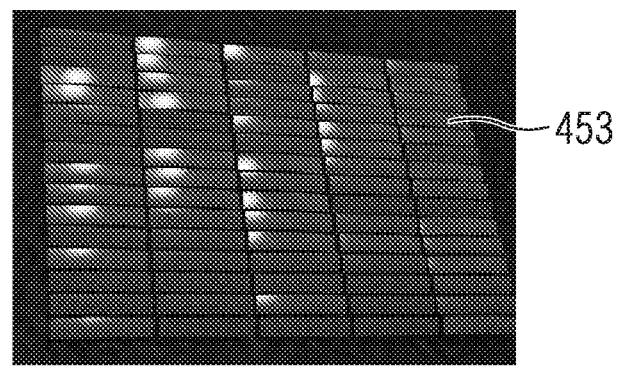

FIG 30
(a)
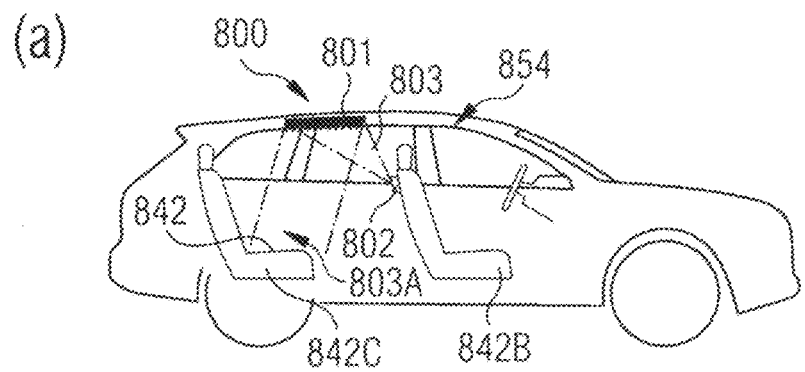
(b)
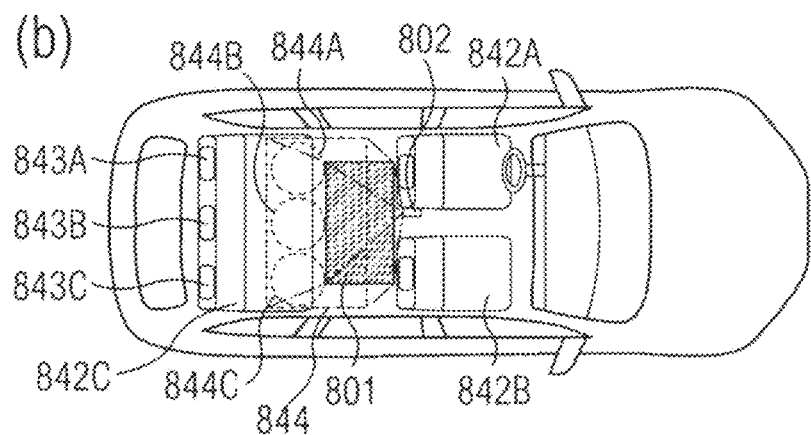
FIG 31
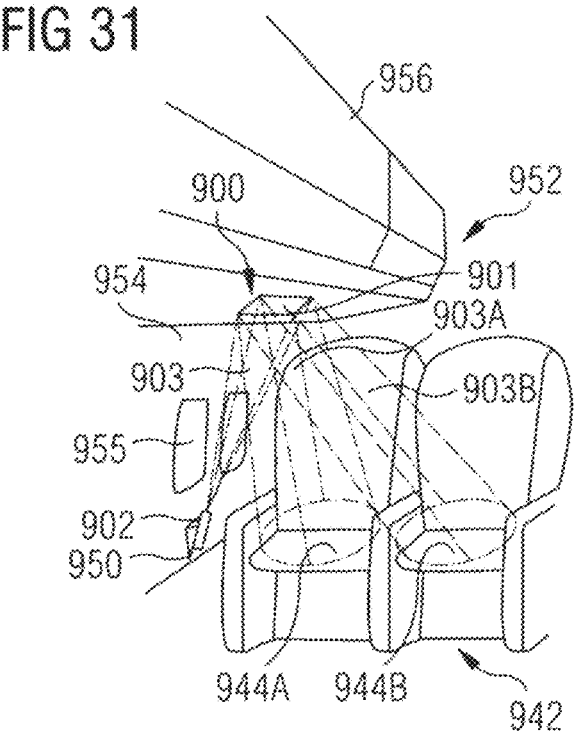

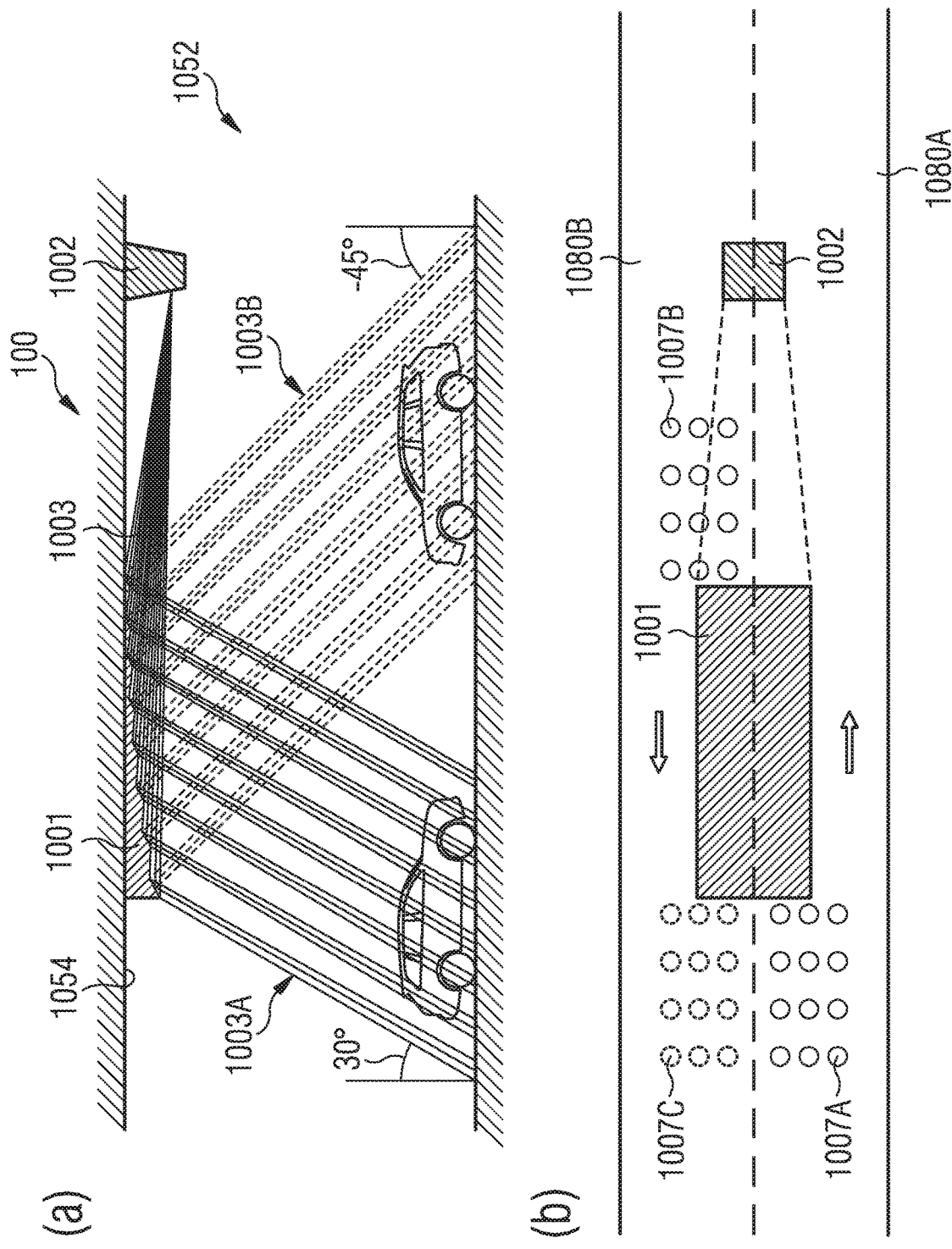

REFLECTIVE ILLUMINATION SYSTEMS FOR OPTICALLY WIDENED PERCEPTION

TECHNICAL FIELD

The present disclosure relates generally to lighting systems, in particular to lighting systems for optically providing a widened perception/impression of the ambient space and in particular for imitating natural sunlight illumination. Moreover, the present disclosure relates generally to implementing such a lighting system, for example, in an indoor room or an outdoor environment.

BACKGROUND

The improvements in mirror manufacturing techniques during the 16th century caused an increasing use of optical mirror elements in interior architecture. For example, the overlay of a portion of a wall with a reflective surface generated the impression of space enhancement and an increase of depth perception. Since then, mirrors became essential components capable of improving the comfort of an ambience through a widening in the perceived volume. In general, in modem and contemporary architecture, reflective surfaces are used to provide for specific perceptions by an observer.

The following disclosure is at least partly based on specific nanoparticle based reflective units, and their application in the field of active illumination such as in lighting in general.

As will be disclosed herein, the specific nanoparticle based reflective units may be used to provide for a specific visual perception of a wall for the observer. Those units may provide specific chromatic and reflective features that provide for properties of sun imitating lighting systems such as described, for example, in the international patent application PCT/EP2014/059802, filed on 13 May 2014 by the same applicants, in which reflective and diffusing layers are combined.

On Rayleigh-like diffusing layers, several applications such as EP 2 30 478 A1, EP 2 304 480 A1, and WO 2014/076656 A1, filed by the same applicants, disclose lighting systems that use a light source producing visible light, and a panel containing nanoparticles used in transmission, i.e. the light source and the illuminated area are positioned on opposing sides of the panel. During operation of those lighting systems, the panel receives the light from the light source and acts in transmission as a so-called Rayleigh diffuser, namely it diffuses incident light similarly to the earth atmosphere in clear-sky conditions. Specifically, the concepts refer to directional light with lower correlated color temperature (CCT), which corresponds to sunlight, and diffuse light with larger CCT, which corresponds to the light of the blue sky.

Introducing a reflective feature as, for example, in PCT/EP2014/059802 mentioned above, however, may affect the perception due to the presence of the reflection. In particular, for lighting systems that intend to trick the eye by providing a natural imitating sky sun illumination, for example together with a visual appearance of the sky and the sun, inhomogeneities in color and luminance are avoided or at least reduced in order to preserve the desired optical and visual effect.

Thus, the present disclosure is directed, at least in part, to improving or overcoming one or more aspects of prior systems.

SUMMARY OF THE DISCLOSURE

In a first aspect, the present disclosure is directed to an illumination system that comprises a light source configured to generate a light beam, and a chromatic reflective unit for being illuminated by the light beam. The chromatic reflective unit comprises a plurality of non-coplanar reflective surface sections, and a chromatic diffusing layer. The chromatic diffusing layer comprises a plurality of nanoparticles embedded in a matrix. The chromatic diffusing layer is provided upstream of the plurality of reflective surface sections such that at least a portion of the light beam passes through the chromatic diffusing layer before and after being reflected by the plurality of non-coplanar reflective surface sections, and is configured to provide for a specular reflectance that is larger in the red than in the blue and for a diffuse reflectance that is larger in the blue than in the red.

In another aspect, the present disclosure is directed to an illumination system installation comprising a room such as room of a house, a hallway, or a room of hospital or a transportation unit cabin such as an elevator cabin, or a bus/car/train/airplane cabin; and an illumination system as described herein mounted to illuminate the inside of the room or transportation unit cabin.

In another aspect, the present disclosure is directed to a seat illuminating system comprising a seat arrangement having a seat surface and a target region defined for a person sitting on the seat surface, a mounting structure being spatially fixed with respect to the seat arrangement, and an illumination system as disclosed herein mounted to the mounting structure, wherein at least a subgroup of the reflective surface sections of the plurality of non-coplanar reflective surface sections are arranged to illuminate the target region by an illuminating light beam.

In another aspect, the present disclosure is directed to an automobile tunnel illumination system installation that comprises a tunnel including at least one driving lane and a tunnel ceiling, and an illumination system as disclosed herein, wherein the light source and the chromatic reflective unit are mounted to the tunnel ceiling, and the chromatic reflective unit comprises a subgroup of reflective surface sections of the plurality of non-coplanar reflective surface sections that is oriented to illuminate the at least one driving lane.

In general, the non-coplanar reflective surface sections do not lie in the same plane and can be characterized by its reflective feature. For example, for a planar reflective surface section, the normal to the plan of the reflective surface section defines the direction of a reflected light beam. Similarly, for a reflective surface section having a convex or concave shape, one can associate an associated normal (later-on referred to as "associated normal na") to the surface section that is given by the reflective feature. The incident light beam impinges on the surface section under a specific incident direction—i.e. an incident angle within the illumination system reference. For a reflective surface section, a (divergent or focused) reflected light beam can be associated with a reflected light beam direction that together with the incident light beam defines the associated normal as in the planar case.

In some embodiments, the chromatic diffusing layer has a back side provided at the reflective surface sections and a front side for being illuminated by incident light. Moreover, the chromatic diffusing layer comprises a plurality of nanoparticles embedded in a transparent matrix, wherein a difference in the refractive index of the nanoparticles with respect to the refractive index of the matrix, a size distribution of the nanoparticles, and a number of nanoparticles per unit surface area may be selected to provide for a specular reflectance that is larger in the red than in the blue and for a diffuse reflectance that is larger in the blue than in the red.

In some embodiments, a shape provided by the plurality of non-coplanar reflective surface sections may be characterized by a variation in a distance to a reference plane that is measured along a straight measurement line extending along the reference plane, wherein the reference plane is coplanar with respect to a central plane of the plurality of non-coplanar reflective surface sections, the central plane has (a reflector side and) a diffusing layer side, the reference plane is displaced from the central plane at the diffusing layer side beyond any one of the plurality of non-coplanar reflective surface sections, and the variation in the distance comprises at least three local extrema and in particular the distance increases and decreases at least twice along the measurement line.

In some embodiments, chromatic diffusing layer is configured as a diffused light generator for generating diffused light at a second correlated color temperature, which is larger than a first correlated color temperature of directed non-diffused light of the incident light beam, and is at least partially transparent for the directed non-diffused light of the light beam.

In some embodiments, the chromatic reflective unit is configured such that, with respect to a single one of the plurality of reflective surface sections and/or with respect to a subgroup of the plurality of reflective surface sections and/or with respect to the plurality of reflective surface sections, there is provided a constant or varying scattering characteristic of a respective chromatic diffusing layer section; and/or a constant or varying number of nanoparticle per unit surface area: and/or a constant or varying inclination angle.

It will be understood herein that non-coplanar reflective surface sections do not lie in the same plane and that any combination of a reflective surface section with a chromatic diffusing layer (or optically associated section of a chromatic diffusing layer) can be considered to form a chromatic reflective section of the chromatic reflective unit In another aspect, an illumination system comprises a light source configured to emit at least one light beam including directed light from a respective emitting surface. The light beam may have, for example, an angular divergence in the range up to 80°, such as in a range up to 60°, or a range up to 400 or less. The illumination system further comprises a chromatic diffusing layer comprising a plurality of nanoparticles embedded in a matrix. The chromatic diffusing layer is provided within the at least one light beam such that at least a portion of the light beam passes through the chromatic diffusing layer, and is configured to emit diffuse light such as diffuse Rayleigh-like scattered light derived from the light beam. The illumination system further comprises a continuous coarse grain surface comprising a plurality of mosaic-like surface structures providing a plurality of surface sections (in general at least subgroups of non-coplanar surface sections) for interacting with the light beam. The illumination system is further configured to provide for perception of directed light of the light beam and diffuse Rayleigh-like scattered light propagating to a target illumination/observer area. Furthermore, a correlation area of the mosaic-like surface structures is selected to provide for a fragmentation of the vision of the light source emitting area when seen along an optical path including the continuous coarse grain surface from the target illumination/observer area. Moreover, the plurality of surface sections are configured to redirect incident light beam portions such that the light beam downstream the continuous coarse grain surface is broadened in size, and the illuminance values on the target illumination/observer area are reduced, in particular compared to the case of propagation at the same optical distance in the case of, instead of the coarse grain surface, an equivalent (in materials, thickness) but planar surface. Moreover, the plurality of surface sections are configured such that redirected light beam portions exhibit local luminous peaks with a luminance comparable to the luminance of the emitting surface, and scattered light is perceived around redirected light beam portions, in particular alternating with luminance local peaks.

Even more generic, providing a coarse grain structure as disclosed herein for interacting with a light beam allows broadening the light beam, while providing luminous peaks with a luminance comparable to the luminance of the light beam, in particular in configurations where the respective light beam portions/the respective reflective surface sections can be resolved.

Further embodiments of the above aspects, are disclosed in the claims, which are incorporated herein by reference.

For example, in some embodiments, the reflective structural unit is based on a mirror structure as disclosed in the above mentioned international patent application PCT/EP2014/059802, which is incorporated herein by reference. In particular, international patent application PCT/EP2014/059802 discloses a mirror with a mirroring surface and a diffusing layer, in front of the mirroring surface that is used, for example, to illuminate an object of an exhibition in a sun-like manner. The diffusing layer preferentially scatters short-wavelength components of impinging light with respect to long-wavelength components of the impinging light. For example, the scattering occurs in the Rayleigh or extended Rayleigh-like regime.

With respect to the chromatic diffusing layer of the reflective structural unit, the present disclosure relates to an optical diffuser as disclosed in WO 2009/156348 A1, filed by the same applicants, as a sky-sun nanodiffuser in the noon configuration. Therein the term "sky-sun nanodiffuser" designates an optical diffuser that simulates the diffusion of the sunlight by the sky in nature. Accordingly, the herein disclosed chromatic reflective unit may relate in some embodiments to an optical nanodiffuser of that type disclosed in WO 2009/156348 A1. In particular, the chromatic diffusing layer may comprise an essentially transparent solid matrix in which a plurality of solid essentially transparent nanoparticles are dispersed, e.g. in a thin film, coating, or bulk material such as sandwich embodiments. In the present description the terms "diffusing layer", "nanodiffuser", and in actively illuminated embodiments "chromatic diffusing layer" designate in general an optical element, which comprises a matrix embedding those (essentially transparent) nanoparticles.

The chromatic diffusing layer is in principle capable of (chromatically) separating different chromatic components of incident light having a broad spectral bandwidth (such as in general white light) according to the same mechanism that gives rise to chromatic separation in nature. Rayleigh scattering is creating, for example, the spectral distribution characteristic of skylight and sunlight. More particularly, the chromatic diffusing layer is capable of reproducing—when subject to visible white light—the simultaneous presence of two different chromatic components: a diffused sky-like light, in which blue—in other words the blue or "cold" spectral portion—is dominant, and a transmitted and by the reflective surface reflected incident light, with a reduced blue component—in other words the yellow or "warm" spectral portion.

Referring to reflecting properties of a chromatic reflective section of the chromatic reflective unit, its structure is such that it achieves—based on the nanoparticles—such a specific optical property that comprises a specular reflectance that is larger in the red than in the blue, and a diffuse reflectance that is larger in the blue than in the red. The optical property can be fulfilled, for example, over at least 50% of the reflective surface section, preferably over at least 70%, or even over at least 90%.

Herein, as defined in the Standard Terminology of Appearance, ASTM international, E 284-09a, the reflectance is in general the ratio of the luminous flux to the incident flux in the given conditions. For example, the diffuse reflectance is a property of the respective specimen that is given by the ratio of the reflected flux to the incident flux, where the reflection is at all angles within the hemisphere bounded by the plane of measurement except in the direction of the specular reflection angle. Similarly, the specular reflectance is the reflectance under the specular angle, i.e. the angle of reflection equal and opposite to the angle of incidence. In the context of the present disclosure, for a given wavelength and a given position on the reflective surface section, the diffuse reflectance and the specular reflectance are intended for non-polarized incident light with an incident angle of 45° with respect to the normal to the reflective surface section at the given position. For measurements, the angular size of the detector for the measurement of specular reflection and the angular aperture of the incident beam is selectable in a range as it will be apparent to the skilled person. In particular when considering (white light) low angle diffusers, for example, the angular size of the detector for the measurement of specular reflection and the angular aperture of the incident beam should be configured so that the sensor accepts rays with a reflection within a cone around the reflection axis. In some embodiments, an angular aperture of 2 times 0.90 may be used as disclosed, for example, in BYK-Gartner "Perception and Objective Measurement of Reflection Haze" for hazemeters and glossmeters introduction, Friedhelm Fensterseifer, BYK-Gardner, BYK-Gardner Catalog 2010/2011).

Moreover, the reflected flux is averaged over all possible incidence azimuthal angles. In case the measurement of the diffused reflectance and/or the specular reflectance is hindered by geometrical or other physical constraints related to the configuration of the chromatic reflective unit, the skilled person may have access to the above mentioned quantities by forming at least one separate chromatic reflective section from the chromatic reflective unit and measuring the reflectance directly onto that section. For details of microscopic structural properties, it is referred to, for example, the above mentioned publication WO 2009/156348 A1. However different values of microscopic parameters may be applicable. For example, one may apply parameters that lead to a larger amount of scattered light with respect to non-scattered light. Similarly, in the aim of minimizing or at least reducing the visibility of the specularly reflected scene, one may prefer increasing the contribution to the luminance of the chromatic reflective unit due to diffused light in spite of the fact that the resulting perceived color may depart from the color of a perfect clear sky. The latter may be caused, for example, by reducing the level of color saturation as a consequence of the multiple scattering arising therein and may be even caused at concentrations below the concentration giving rise to multiple scattering.

In the following, some microscopic features are summarized exemplarily.

The chromatic effect is based on nanoparticles having a size in the range from, for example, 10 nm to 240 nm. For example, an average size may be in that range.

It is well known from fundamentals of light-scattering that a transparent optical element comprising transparent matrix and transparent nanoparticles having different refraction index with respect to the matrix, and having sizes (significantly) smaller than visible wavelength, will preferentially scatter the blue part (the blue) of the spectrum, and transmit the red part (the red). While the wavelength-dependence of the scattering efficiency per single particle approaches the $\lambda^{-4}$ Rayleigh-limit law for particle sizes smaller or about equal to $1/10$ of the wavelength $\lambda$, a respective acceptable optical effect may be reached already in the above range for the size of the nanoparticles. In general, resonances and diffraction effects may start to occur at sizes larger, for example, half the wavelength.

On the other side, the scattering efficiency per single particle decreases with decreasing particle size d, proportional to $d^{-6}$, making the usage of too small particle inconvenient and requiring a high number of particles in the propagation direction, which in turn may be limited by the allowed filling-fraction. For example, for thick scattering layers, the size of the nanoparticles embedded in the matrix (and in particular their average size) may be in the range from 10 nm to 240 nm, such as 20 nm to 100 nm. e.g. 20 nm to 50 nm, and, for compact devices, e.g. using thin layers such as coatings and paints, the size may be in the range from 10 nm to 240 nm, such as 50 nm to 180 nm, e.g. 70 nm to 120 nm.

In some embodiments, larger particles may be provided within the matrix with dimensions outside that range but those particles may not affect the Rayleigh-like feature and, for example, only contribute to forming a low-angle scattering cone around the specular reflection.

The chromatic effect is further based on nanoparticles having a refractive index that is different than the refractive index of the embedding matrix. To scatter, the nanoparticles have a real refractive index $n_p$ sufficiently different from that of the matrix $n_h$, (also referred to as host material) in order to allow light scattering to take place. For example, the ratio m between the particle and host medium refractive indexes $$\left( \text{with } m \equiv \frac{n_p}{n_h} \right)$$

may be in the range $0.5 \leq m \leq 2.5$ such as in the range $0.7 \leq m \leq 2.1$ or $0.7 \leq m \leq 1.9$.

The chromatic effect is further based on the number of nanoparticles per unit area seen by the impinging light propagating in the given direction as well as the volume-filling-fraction f. The volume filling fraction f is given by $$f = \frac{4}{3}\pi \left(\frac{d}{2}\right)^3 \rho$$

with $\rho$ [meter$^{-3}$] being the number of particles per unit volume. By increasing f, the distribution of nanoparticles in the diffusing layer may lose its randomness, and the particle positions may become correlated. As a consequence, the light scattered by the particle distribution experiences a modulation which depends not only on the single-particle characteristics but also on the so called structure factor. In general, the effect of high filling fractions is that of severely depleting the scattering efficiency. Moreover, especially for smaller particle sizes, high filling fractions impact also the dependence of scattering efficiency on wavelength, and on angle as well. One may avoid those "close packing" effects, by working with filling fractions $f \leq 0.4$, such as $f \leq 0.1$, or even $f \leq 0.01$ such as $f=0.001$.

The chromatic effect is further based on a number N of nanoparticles per unit area of the chromatic diffusive layer in dependence of an effective particle diameter $D=d\,n_h$. Thereby, d [meter] is the average particle size defined as the average particle diameter in the case of spherical particles, and as the average diameter of volume-to-area equivalent spherical particles in the case of non-spherical particles, as defined in [T. C. GRENFELL, AND S. G. WARREN, "Representation of a non-spherical ice particle by a collection of independent spheres for scattering and absorption of radiation". Journal of Geophysical Research 104, D24, 31,697-31,709. (1999)]. The effective particle diameter is given in meters or, where specified in nm.

In some embodiments:

$$N \geq N_{min} = \frac{2.07 \times 10^{-29}}{D^6} \left|\frac{m^2+2}{m^2-1}\right|^2 \; [\text{meters}^{-2}],$$

(D given in [meters]) and $$N \leq N_{max} = \frac{1.21 \times 10^{-27}}{D^6} \left|\frac{m^2+2}{m^2-1}\right|^2 \; [\text{meters}^{-2}];$$

for example, $$N \geq N_{min} = \frac{4.24 \times 10^{-29}}{D^6} \left|\frac{m^2+2}{m^2-1}\right|^2 \; [\text{meters}^{-2}] \text{ and}$$

$$N \leq N_{max} = \frac{9.27 \times 10^{-28}}{D^6} \left|\frac{m^2+2}{m^2-1}\right|^2 \; [\text{meters}^{-2}],$$

more specifically $$N \geq N_{min} = \frac{8.99 \times 10^{-29}}{D^6} \left|\frac{m^2+2}{m^2-1}\right|^2 \; [\text{meters}^{-2}] \text{ and}$$

$$N \leq N_{max} = \frac{6.48 \times 10^{-28}}{D^6} \left|\frac{m^2+2}{m^2-1}\right|^2 \; [\text{meters}^{-2}].$$

For example, for embodiments aiming at simulating the presence of a pure clear sky, $$N \geq N_{min} = \frac{2.07 \times 10^{-29}}{D^6} \left|\frac{m^2+2}{m^2-1}\right|^2 \; [\text{meters}^{-2}],$$

(D given in [meters]) and $$N \leq N_{max} = \frac{3.69 \times 10^{-28}}{D^6} \left|\frac{m^2+2}{m^2-1}\right|^2 \; [\text{meters}^{-2}] \text{ such as}$$

$$N \geq N_{min} = \frac{4.24 \times 10^{-29}}{D^6} \left|\frac{m^2+2}{m^2-1}\right|^2 \; [\text{meters}^{-2}] \text{ and}$$

$$N \leq N_{max} = \frac{2.79 \times 10^{-28}}{D^6} \left|\frac{m^2+2}{m^2-1}\right|^2 \; [\text{meters}^{-2}],$$

more specifically $$N \geq N_{min} = \frac{8.99 \times 10^{-29}}{D^6} \left|\frac{m^2+2}{m^2-1}\right|^2 \; [\text{meters}^{-2}] \text{ and}$$

$$N \leq N_{max} = \frac{2.06 \times 10^{-28}}{D^6} \left|\frac{m^2+2}{m^2-1}\right|^2 \; [\text{meters}^{-2}].$$

In other embodiments aiming at minimizing the contribution of a specular reflected scene, $$N \geq N_{min} = \frac{2.79 \times 10^{-28}}{D^6} \left|\frac{m^2+2}{m^2-1}\right|^2 \; [\text{meters}^{-2}],$$

(D given in [meters]) and $$N \leq N_{max} = \frac{1.21 \times 10^{-27}}{D^6} \left|\frac{m^2+2}{m^2-1}\right|^2 \; [\text{meters}^{-2}] \text{ such as}$$

$$N \geq N_{min} = \frac{3.69 \times 10^{-28}}{D^6} \left|\frac{m^2+2}{m^2-1}\right|^2 \; [\text{meters}^{-2}] \text{ and}$$

$$N \leq N_{max} = \frac{9.27 \times 10^{-28}}{D^6} \left|\frac{m^2+2}{m^2-1}\right|^2 \; [\text{meters}^{-2}],$$

more specifically $$N \geq N_{min} = \frac{4.85 \times 10^{-28}}{D^6} \left|\frac{m^2+2}{m^2-1}\right|^2 \; [\text{meters}^{-2}] \text{ and}$$

$$N \leq N_{max} = \frac{6.48 \times 10^{-28}}{D^6} \left|\frac{m^2+2}{m^2-1}\right|^2 \; [\text{meters}^{-2}].$$

With respect to those physical parameters and their general interplay, it is again referred to, for example, WO 2009/156348 A1.

The macroscopic optical properties of the chromatic reflective unit disclosed herein, and in particular a chromatic reflective section, can be described in terms of the two following quantities:

(i) The monochromatic normalized specular reflectance $R(\lambda)$, defined as the ratio between the specular reflectance of the chromatic reflective unit and the specular reflectance of a reference sample identical to the chromatic reflective unit except for the fact that the diffusing layer does not contain the nanoparticles having a size in the range from 10 nm to 240 nm, i.e. the nanoparticles which are responsible of preferentially diffusing the short wavelengths of the impinging radiation.

(ii) The ratio $\gamma$ between the blue and the red optical densities defined as: $\gamma=\text{Log }[R(450\text{ nm})]/\text{Log }[R(630\text{ nm})]$ that measures the capacity of the chromatic reflective device to provide chromatic separation between long and short wavelength components of the impinging radiation.

In some embodiments, the chromatic reflective unit, and in particular a chromatic reflective section, may have:

R(450 nm) in the range from 0.05 to 0.95, for example from 0.1 to 0.9 such as from 0.2 to 0.8. For example for embodiments aiming at simulating the presence of a pure clear sky, R(450 nm) may be in the range from 0.4 to 0.95, for example from 0.5 to 0.9 such as from 0.6 to 0.8.

In embodiments aiming at reducing (e.g. minimizing) the contribution of a specular reflected scene, R(450 nm) may be in the range from 0.05 to 0.5, for example from 0.1 to 0.4 such as 0.2 up to 0.3.

With respect to the ratio γ between the blue and the red optical densities in some embodiments, γ may be in the range 5≥γ≥1.5, or even 5≥γ≥2, or even 5≥γ≥2.5 such as 5≥γ≥3.5.

For completeness, inorganic particles suited for this type of application may be those that include but are not limited to ZnO, $TiO_2$, $ZrO_2$, $SiO_2$, and $Al_2O_3$ which have, for example, an index of refraction $n_p$=2.0, 2.6, 2.1, 1.5, and 1.7, respectively, and any other oxides which are essentially transparent in the visible region. In the case of inorganic particles, an organic matrix or an inorganic matrix may be used to embed the particles such as soda-lime-silica glass, borosilicate glass, fused silica, polymethylmethacrylate (PMMA), and polycarbonate (PC). In general, also organic particles may be used, in particular for illuminated configurations having, for example, a reduced or no UV portion.

The shape of the nanoparticle can essentially be any, while spherical particles are most common.

As mentioned above, the nanoparticles and/or the matrix and/or further embedded particles may not—or may only to some limited extent—absorb visible light. Thereby, the luminance and/or the spectrum (i.e. the color) of the light exiting the chromatic reflective unit may only be very little or not at all affected by absorption. An essentially wavelength-independent absorption in the visible spectrum may be acceptable.

In some embodiments, a secondary chromatic diffusing layer associated light source is used, for example, for an additional illumination of the chromatic diffusing layer from the side. Exemplary embodiments are disclosed, for example, in WO 2009/156347 A1. In those embodiments, the chromatic diffusing layer may be configured to interact primarily with the light of that secondary light source or with the light from both light sources to provide for the diffuse light.

In some embodiments, a CCT of the diffuse light component from the luminous layer (e.g. in those propagation directions not associated with the illuminating light beam) is 1.2 times larger or 1.1 times larger than the CCT of the light of the illuminating light beam.

In some embodiments, the reflective surface is planar or curved such as a parabola.

Combining the above features of the chromatic diffusing layer with the structural features disclosed herein may allow addressing one or more aspects of the prior art as will be exemplarily described below for various exemplary embodiments.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 2(a) is a schematic top view of an exemplary chromatic reflective unit with a plurality of reflective surface sections;

FIG. 2(b) and FIG. 2(c) are schematic cross-sections of the chromatic reflective unit for illustrating the contributions of diffused light and specular reflected light for the appearance;

FIG. 3 is an illustration for defining the surface shape of a reflective surface based on the cross-section shown in FIG. 2;

FIGS. 4 to 6 are schematic cross-sections of a sandwich-type configurations of chromatic reflective units;

FIGS. 7 to 9 are a schematic cross-section, a schematic top view, and a schematic 3D-view, respectively, of a panel-based configuration of chromatic reflective units;

FIGS. 19(a) and 19(b) are a schematic illustrations of a glass panel based and a sandwich based mirror unit, respectively;

FIG. 25 is a 3D-illustration of the illumination of a room in case of a chromatic reflective unit having randomly oriented curved reflective surface sections;

FIGS. 26(a) and 26(b) are illustrations of the appearance of the chromatic reflective unit of FIG. 25 from two positions within the reflected light beam;

FIGS. 30(a) and 30(b) are schematic illustrations of an exemplary installation of a rear seat illuminating system within a car;

FIG. 31 is a schematic view of a seat illuminating system in a cabin such as a cabin of a train or airplane; and FIG. 32 is a schematic illustration of an automobile tunnel illumination concept.

DETAILED DESCRIPTION

Figure 1:
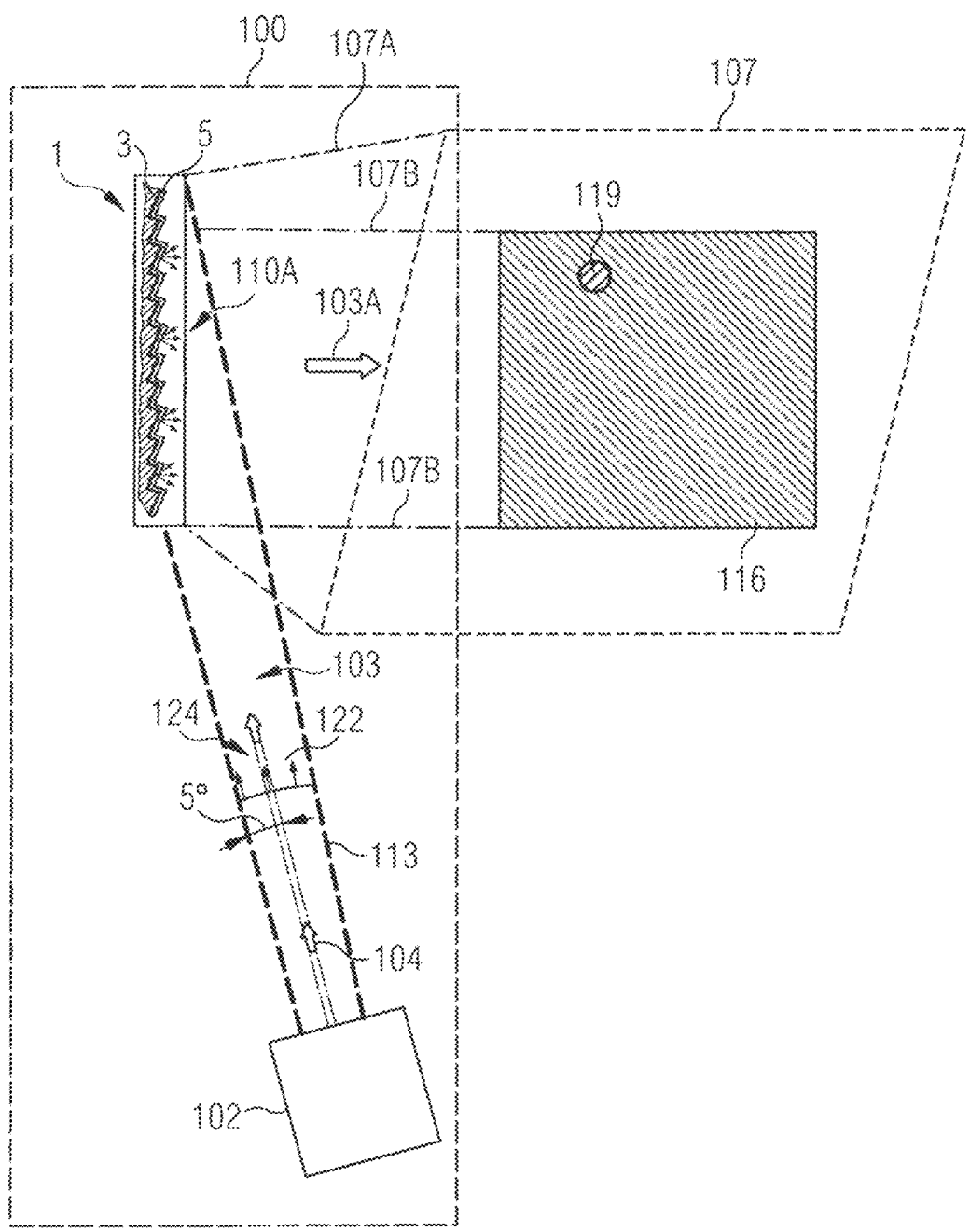
FIG. 1 is a schematic illustration of an exemplarily illumination system specifically illustrating the concept of a chromatic reflective unit.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that in illumination systems like those described in the above mentioned PCT/EP2014/059802 the specular reflection of a surrounding scene, as for example a scene of a recognizable indoor or outdoor environment or any scene featuring a spatially structured luminance distribution, is superimposed as a background to the blue scattered light. This may result in a degradation of color uniformity and luminance uniformity of light emitted by the device, and therefore also in a spoiling of the desired perception of an infinitely deep sky.

It was further realized that the color-spoiling effect of the specular reflection of bright objects in the surrounding scene may be reduced and even overcome, when one reduces the geometric homogeneity of the reflecting surface. For example, providing a random orientation of reflective surface sections in an illumination system will avoid a clear image of a reflected area. Herein, a random orientation of reflective surface sections is understood as essentially not being uniform. For example, in view of the limited number of reflective surface sections, a discrete number of orientations (inclination angles/incident angles) may be selected and the reflective surface sections may be associated individually or in groups to the orientations.

Similarly, providing subsets of reflecting surface sections having essentially identical orientation within a subset but different orientation between subsets similarly may avoid the appearance of a clear reflected image (or provide the same to be viewable at different positions as discussed below). Accordingly, those structures may allow maintaining the specific depth perception that can be provided by chromatic reflective units as disclosed herein.

Furthermore, the disclosure is based in part on the realization that one may increase those observation areas of an illumination system that are subject to the sun-sky vision by providing two or more subgroups of reflective surface sections each subgroup reflecting an associated portion of the light beam (each incident under a different angle) to a specific observation area spatially separated from those of other groups. This may allow, for example, a sun-sky-impression for an observer at multiple observer areas.

The disclosure is further based in part on the realization that—by providing a plurality of non-coplanar reflective surface section—one may enlarge and/or broaden and/or focus a reflected beam to a respective larger or smaller observation area. Thereby, the sun-sky-impression of an illumination system may be accessible from an enlarged observer area.

In the following, various embodiments of illumination systems using a chromatic reflective unit are disclosed. In connection with FIGS. 1 to 19, the general concept of an illumination system and exemplary embodiments of chromatic reflective units are disclosed. In connection with FIGS. 20 to 27, the visual perception of exemplary embodiments of chromatic reflective units is illustrated. In connection with FIGS. 28 to 32, exemplary configurations of illuminating systems and their installations in exemplary environments are described.

Herein, an illumination system is considered to comprise essentially a light source such as a light projector and a chromatic reflective unit of the specific type that inter alia allows sunlight-like illumination. Those components are specifically adapted, oriented, and mounted with respect to a to be illuminated target region. Various features of the underlying illumination systems will be exemplarily described in the following and then brought into context of selected exemplary implementations of illumination systems.

Referring to FIG. 1, aspects of an optical setup as well as the perceptive aspects of illuminations systems (as generally disclosed herein) are described for an exemplary illumination system 100.

Illumination system 100 comprises a light source 102, configured to emit light in an emission solid angle to form a light beam 103 (in FIG. 1 delimited by dashed lines 113) propagating along a main light beam direction 104 (also referred to as main beam axis). Generally, light source 102 can be, for example, a cool white light source. Exemplary embodiments of light sources may comprise LED based light emitters or discharge lamp based light emitters or hydrargyrum medium-arc iodide lamp based light emitters or halogen lamp based light emitters and respective optical systems downstream of the respective light emitter.

Regarding light sources applicable to the technology disclosed herein, it is further referred to PCT/EP2014/001293, entitled "Light source and sunlight imitating lighting system," filed on 14 May 2014 by the same applicants, the contents of which are herein incorporated in their entirety. In particular PCT/EP2014/001293 illustrates light source configurations providing high quality light beams. In general, the distance of the light beam propagation prior incidence onto the reflector unit may be at least 0.3 m such as at least 0.5 m or at least 1 m. In some embodiments, the light source may be a light projector configured to provide a light beam, for example, with a flat top intensity profile extending across the complete chromatic reflective unit.

To further reduce the dimension of illumination system 100, the optical systems downstream of the respective light emitter may include an optical system such as folding optics (not shown in the embodiment of FIG. 1) or aperture based imaging. For the optical imaging system, there may be geometric conditions on, for example reflected, light rays of the light beam to be specifically matched in dimension with downstream optical components.

Illumination system 100 further includes a chromatic reflective unit 1 that couples the light originating from light source 102 to a region to be lit up, for example an area in which a sitting person would require light. e.g. on its lap when reading a book. In general, chromatic reflective unit 1 comprises a plurality of non-coplanar reflective surface sections (usually formed by a reflective layer 3, and a chromatic diffusing layer 5 provided on the plurality of reflective surface sections such that at least a portion of light beam 103 passes through chromatic diffusing layer 5 before and after being reflected by the plurality of non-coplanar reflective surface sections. In some embodiments, thereby a plurality of illuminating light beam portions may be formed.

Chromatic diffusing layer 5 comprises a plurality of nanoparticles embedded in a matrix, wherein a difference in the refractive index of the nanoparticles with respect to the refractive index of the matrix. A size distribution of the nanoparticles and a number of nanoparticles per unit surface area are selected to provide for a specular reflectance that is larger in the red than in the blue and for a diffuse reflectance that is larger in the blue than in the red.

Reflective layer 3 is generally any type of optical acting interface that reflects light having passed through chromatic diffusing layer 5. For example, reflective layer 3 may be a surface of an aluminum layer or an interface between components, such as a reflective coating. Due to reflective layer 3, light of light beam 103 being incident on reflective layer 3 is redirected to pass again through chromatic diffusing layer 5, thereafter forming an illuminating light beam 103A (in FIG. 1 delimited by dash-dash-dotted lines 107A). In FIG. 1, a range 107 of visible sun locations is illustrated, where it is referred in the wording "visible sun locations" exemplarily to the "sun" because an especially impressive type of embodiments of illumination system 100 relates to sun-like illumination. Illuminating light beam 103A is, thus, directed in the to be illuminated region. Illuminating light beam 103A comprises directed light (later also referred to as directed (light) component of the illumination system).

Chromatic diffusing layer 5 is generally configured for emitting diffuse light (later also referred to as diffuse (light) component of the illumination system) at a first color, e.g. in case of a sky imitation a blueish sky color. Chromatic diffusing layer 5 is superimposed to reflective layer 3, extends in front of reflective layer 3, and provides for a visible front area section 110A of chromatic reflective unit 1 that an observer can see when looking at chromatic reflective unit 1. Through/from visible front area section 110A, the diffuse light component is emitted.

Light source 102 provides light beam 103 that is usually adapted in size for illuminating visible front area section 110A. In particular for a consistent perception in a sun imitating configuration, the illumination may ensure that the sun is seen until it vanishes at the boarder of visible front area section 110A when an observer moves across range 107 of visible sun locations. Moreover, in case of the passive generation of light by chromatic diffusing layer 5 as discussed below, the illumination of visible front area section 10A may result in the complete visible front area section 110A contributing to and generating the diffuse light component at the first color.

Comprehensively illuminating visible front area section 110A ensures further that at least a portion of light beam 103 passes through chromatic diffusing layer 5 before and after being reflected by the reflective surface sections. The reflective surface sections usually extend similarly in size to front area section 110A. Illuminating light beam 103A has a second color that is associated with, e.g., an illuminating light beam CCT. The first color associated with light emitted from chromatic diffusing layer 5 and the second color associated with illuminating light beam 103A are separated in color space.

For example, the first color and the second color may be separated in the CIE 1976 (u',v') color space by, at least 0.006, at least 0.008 such as at least 0.01, 0.025, or 0.04, where the color difference $\Delta u'v'$ is defined as the Euclidean distance in the u'v' color space. In particular for sun-imitation configurations, the illuminating light beam CCT of the second color may be close to the Planckian locus (e.g. in the range from 800 K to 6 500 K). In some embodiments the second color may correspond to u'v' points with a maximum distance from the Planckian locus of e.g. 0.06. In other words, a distance from the Planckian locus is, for example in the range from 800 K to 6500 K, given by $\Delta u'v' \leq 0.060$. In context with the color space and the respective color measurement, it is referred to FIGS. 15 and 16 as well as the related disclosure in PCT/EP2015/000407, entitled "ILLU-MINATIOAN SYSTEM FOR OPTICALLY WIDENED PERCEPTION" filed on 23 Feb. 2015 by the same applicants.

As it is apparent to the skilled person, depending on any interaction of chromatic diffusing layer 5 with light beam 103, the color and/or CCT of light beam 103 and illuminating light beam 103A may be essentially identical or may differ. Depending from the type of nanoparticles and their concentration, the CCT difference may be, for example, at least 300 K or even 1.000 K or more.

Looking from within range 107 of visible sun locations onto chromatic reflective unit 1, an observer may have an optical perception as schematically indicated in FIG. 1 within range 107. The optical perception essentially depends on chromatic reflective unit 1 and the light coming therefrom as illustrated by dash-dotted lines 107B being specific for the respective observer position. Specifically, illumination system 100 is configured such that light of significant intensity incident within range 107 of visible sun locations originates from visible front area section 110A. The light of significant intensity comprises light of illuminating light beam 103A (originating from light source 102 and being light of light beam 103 redirected by reflective layer 3), and diffuse light originating from chromatic diffusing layer 5.

In line with the optical perception illustrated in FIG. 1 for an exemplary configuration of chromatic reflective unit 1, the observer, when looking from within range 107 of visible sun locations onto chromatic reflective unit 1, sees a large area 116 corresponding to visible front area section 110A based on the homogenously emitted diffuse light at the first color. In addition, the observer sees a sun-like spot 119 at the second color caused by the reflected light of light source 102, specifically of illuminating light beam 103A.

Chromatic reflective unit 1 may be of any shape such as a (planar) rectangular, quadratic, or circular shape. Chromatic reflective unit 1 is at least partly reflecting the light of light source 102. Chromatic diffusing layer 5 of chromatic reflective unit 1 may operate as a diffuse light generator such as a Rayleigh or Rayleigh-like diffuser, which substantially does not absorb light in the visible range and which diffuses more efficiently the short-wavelength in respect to the long-wavelength components of the impinging light. Optical properties and microscopic characteristic of Rayleigh like diffusers are described in detail for the above mentioned transmissive type patent applications such as in EP 2 304 478 A1.

In some embodiments, chromatic reflective unit 1 diffuses the light of light source 102, herein referred to as passive diffuse light generation. For passive diffuse light generation, and under the assumption that light beam 103 diverges enough to illuminate completely visible front area section 110A, chromatic reflective unit 1 separates light beam 103 in two components, originating from the complete visible front area section 110A, particularly in:

a reflected (directed non-diffuse) component, formed by light rays that pass twice through chromatic diffusing layer 5 and do not experience significant deviations besides the reflection by reflective layer 3; e.g. is formed by light rays experiencing a deviation smaller than, e.g., 0.1° or 0.05° with respect to the specular reflection; a luminous flux of the transmitted component is a significant fraction of the overall luminous flux incident on chromatic diffusing layer 5; in some embodiments, chromatic diffusing layer may be configured to overlay a low angle white scattering feature onto the incoming light beam, thereby the illuminating light beam may comprise a spread of directions within a small cone (e.g. below 5° or 8°) but such a modified illuminating light beam is still, for the purpose of this disclosure, considered to be a directed light beam (it is noted that such a low angle scattering may allow, for example, averaging out an inhomogeneity over the light source aperture; and a diffuse component, formed by scattered light exiting chromatic diffusing layer 5 through visible front area section 110A (including light scattered and diffused at angles far from the specular reflection direction, e.g. diffused in directions forming and angle with the specular reflection direction larger than 20°, or even 30°, or 40°, this angle being even larger if (white light) low angle diffusers are included: in general, the diffused component is formed by light diffused in directions out of the angular scattering cone associated the (white light) low angle diffuser): the diffuse component includes scattered light directly exiting chromatic diffusing layer 5 and scattered light being reflected by reflective layer 3; a luminous flux of the diffuse component may correspond to a blue skylight fraction generated from the overall luminous flux incident on chromatic diffusing layer 5.

For the passive scattered light generation, the optical properties of chromatic diffusing layer 5 may be such that the fraction of the diffuse component is within the range from 5% to 50% such as within the range from 7% to 40%, or even in the range from 10% to 35%, or within the range from 15% to 30% with respect to the total light falling onto visible front area section 110A (in this respect, the low angle scattering is not considered to contribute to the diffuse component);

the average CCT of the diffuse component is significantly higher than the average correlated color temperature CCT of the reflected component e.g. at angles smaller 0.1° with respect to the specular reflection, for example it may be higher by a factor of at least 1.1, such as 1.2, 1.3, 1.5 or more;

chromatic diffusing layer 5 does not absorb significantly incident light, namely the sum of the two components is at least equal to 80%, or 90%, or even 95%, or 97% or more;

chromatic diffusing layer 5 may scatter mostly forward, namely more than 1.1, or 1.3, or even 1.5, or 2 two times more than is back scattered; forward scattered light during the first passage being reflected by reflective surface sections; and chromatic diffusing layer 5 itself may have low reflection, namely less than a portion of 9%, or 6%, or even less than 3%, or 2% of the impinging light of light beam 103 is reflected.

In other embodiments, chromatic diffusing layer 5 may at least partly be illuminated by a separate light source adapted to provide light as the basis for the diffuse component herein referred to as a side-lit configuration.

In general, light source 102 may illuminate the front surface of chromatic reflective unit 1 in its entirety under a low angle of incidence of beam axis to a normal associable with chromatic reflective unit 1. Due to the specific geometric configuration of chromatic reflective unit 1, despite the low angle incidence, the angle of incidence of beam axis to the normal of the reflective surface sections is usually within the range from, for example, about 15° to about 70° such as, for example, 50° for an angled incidence, or about 20° for a steep incidence. The angle of aperture (full aperture) of the light beam may be in the range from about 10° to about 60°.

In general, chromatic reflective unit 1 is positioned in the far field of light source 102 such that it interacts with a light beam as schematically illustrated in FIG. 1 and described below in more detail. High quality light beams—having, for example, projector angular pupil size in the range of 5° and smaller when evaluated at the distance comparable to that at least of the chromatic reflective unit from the light source—may in particular allow light source 102 to provide a sun-like impression.

FIG. 1 illustrates exemplarily light beam 103 as a divergent light beam in the far field. The far field depends on the near field as generated by light source 102 and is characterized by main light beam direction 104. The local propagation direction across divergent light beam 103, i.e. a propagation direction of the directed non-diffuse light, is modified/changes in dependence of the position within the cross-section of divergent light beam 103 as wells as of illuminating light beam 103A. Exemplarily illustrated for light beam 103 but similarly applicable to illuminating light beam 103A, a central propagation direction 122 is essentially parallel to main light beam direction 104 in an inner area of light beam 103. However, a propagation direction 124 is increasingly inclined with respect to main light beam direction 104 with increasing distance from the inner area. Exemplarily, a maximum angle of 50 is indicated in FIG. 1 for the light beam portion being the furthest out, which corresponds to a beam divergence (also referred to as total angular spread in the far field) of 2×5°=10° of divergent light beam 103 as wells as of illuminating light beam 103A.

However, as will be apparent to the skilled person, in some embodiments disclosed below, the requirements for the light source 102 may be reduced with respect to the beam divergence, for example.

In general, light source 102 may include an emitter unit, a collimation unit, and a homogenization unit, which are those optical units that define an optical near field and emit light through a light source exit aperture that is, for example, fully flashed and represents a light emitting surface with a homogeneous luminance and an etendue that maintained as much as possible the original etendue of the emitter unit.

Light source 102 may further include an electronic control unit (not shown) for providing the electronic background to operating the primary light generation process that takes place in emitter unit. Similarly, light source 102 may include structural components such as a housing to provide support for the optical units and to position them in a fixed manner with respect to each other. Moreover, the generated light is adaptable to the specific aspects of respective illumination conditions. In particular it may be adapted to the interaction with chromatic reflective unit 1, e.g. to provide a desired color of the diffuse and directed components. The adaptation relates inter alia to the emission direction distribution, the color spectrum, and the intensity distribution.

For example, light source 102 provides light in the visible region of the light spectrum with wavelengths between 400 nm and 700 nm with a spectral width larger than 100 nm, e.g. larger than 170 nm.

In dependence of respective embodiments, the distance between light source 102 and chromatic reflective unit 1 may be in the range from 1.5 m to 7 m for a light source having an exit aperture of, for example, 0.15 m. For such a situation, an optical distance between the light source and the observer is, for example, in the range from at least 2.5 m to 9 m or more. Similarly, for example for indoor installation such as seat illuminating applications, the distance between light source 102 and chromatic reflective unit 1 may be in the range from 0.5 m to 1 m for a light source having an exit aperture of, for example, 0.05 m. For such a situation, an optical distance between the light source and the observer may be, for example, in the range from at least 0.5 m to 1 m or more. As apparent to the skilled person, for outdoor configurations those geometries, including distances and pupil size, could increase proportionally by a factor of, for example, 3 to 10.

For the herein disclosed lighting systems, the required total spread in the far field depends on the geometries of the configuration source-reflective unit-target illumination area, including the distance to and the size of the to be illuminated chromatic reflective unit 1. Orthogonal total angular spreads of 10° and 30°, respectively, for a rectangular object (rectangular chromatic reflective unit 1) with size 1 m×2 m being illuminated under 45° provide an acceptable distance between light source 102 and chromatic reflective unit 1. As will be apparent to the skilled person, total angular spreads in the range from 5° to 60° or in the range from 5° to 50° would be applicable for some of those lighting systems discussed herein and respective shapes of chromatic reflective units 1. As will be apparent to the skilled person, the system's internal angular spread may, however, not only depend on the light source but also on the reflective chromatic unit for non-planar reflective surface sections.

It is noted that, when being outside of range 107 of visible sun locations, an observer will—when looking at chromatic reflective unit 1—notice an essentially homogenously emitting diffuse light area. The diffuse light may be in the color spectrum of the sky but without sun-like spot 119 as the reflective arrangement does not allow the observer to see the exit pupil of light source 102. In addition, an observer— being within or outside of range 107 of visible sun locations—sees collimated light of light beam 103A illuminating any surface positioned within range 107 of visible sun locations. Thereby, the perception of the sun-light imitation may be enforced.

The skilled person will recognize those aspects and features disclosed in connection with FIG. 1 that equally will be applicable to the embodiments disclosed below for other embodiments in connection with the remaining figures. This applies, for example, to the chromatic diffusing layer and the light source as well as the discussion of the light propagation.

FIG. 2(a) shows a top view of an exemplary chromatic reflective unit 1 having a plurality of reflective surface sections 3' being covered by chromatic diffusing layer 5. Exemplarily, reflective surface sections 3' in FIG. 2(a) have a rectangular base shape and are arranged such that chromatic reflective unit 1 also has a rectangular base shape. However, other shapes may be applicable.

As will become apparent from the embodiments described in the following, reflective surface sections 3' may be connected by some type of transition surface sections or may be formed by structurally independent surface sections. Moreover, reflective surface section 3' may be planar surfaces in shape (exemplarily in FIG. 1 x- and y-coordinates are indicated) or may extend in 3D as a 3D-type surface such as a curved or partially curved surface. Reflective surface sections 3' may be formed by applying a reflective layer on a plurality of non-com-planar surface sections of a support structure.

FIGS. 2(b) and 2(c) shows schematic cross-sections of chromatic reflective unit 1 of FIG. 1 for illustrating the optical features (see section (b) of FIG. 2) and the optical appearance as affected by a specular reflected image (see section (c) of FIG. 2). The cross-section illustrates a saw-like shape being given in the direction of the cross-section, wherein the y-coordinate defines the direction of the cross-section. As can be seen in FIG. 2, reflective surface sections 3' of chromatic reflective sections 6 form in y-direction a sequence of surface sections being regularly displaced with respect to each other in y-direction and are inclined with respect to the y-direction. Accordingly, reflective surface sections 3' indicated in FIG. 2 are non-coplanar with respect to each other as they do not lie in a common plane.

It is noted that neighboring reflective surface sections in x-direction (see FIG. 1) may in principle be coplanar, or a subgroup of the same may be coplanar as will be described below. However, also in x-direction a similar cross-sectional behavior as discussed below may be present.

Referring to FIG. 2(b), chromatic reflective unit 1 comprises—in a compact configuration—a substrate 7 that is shaped such that the respectively formed and oriented chromatic reflective sections 6 can be provided on its surface. Substrate 7 may be a casted polymeric layer such as foam having a back layer such as metals (e.g. aluminum or steel) and in some cases a layer of PVC may also be added. The provided saw tooth-like bended shape of substrate 7 is transferred to the shape of an applied reflective layer 3.

Reflective surface sections 3' may be sections of a continuous reflective layer 3 such as a reflective coating or a reflective foil provided on substrate 7—acting as a support structure. In some embodiments, the reflective layer may be applied specifically onto respective surface sections 7'. On that reflective layer, chromatic diffusing layer 5 is applied, for example also as a continuous layer. In FIG. 2(b) and FIG. 2(c), reflective layer 3 and chromatic diffusing layer 5 are illustrated by a single line. Each "saw-tooth" of substrate 7 includes a surface section 7', being the basis for a reflective surface sections 3' and, thus, for a chromatic reflective section 6.

Referring to FIG. 2(b), chromatic reflective unit 1 reflects incident light with reflective surface sections 3' after the light having passed chromatic diffusing layer 5 such that specular reflected light has passed chromatic diffusing layer 5 twice. As shown in FIG. 2(b), incident light may be not-directed light 9 as well as light beam 103 that fall onto chromatic reflective unit 1 from the right side in FIG. 2(b).

As discussed above, chromatic diffusing layer 5 is constructed such that it preferentially scatters short-wavelength components of incident light with respect to long-wavelength components of incident light. The scattered light is referred herein as diffuse light 11 and it is associated with a blue (short-wavelength) color assuming a given selection of the scattering conditions of the nanoparticles.

In FIG. 2(b), an exemplary viewing direction 13 of an observer is indicated. In viewing direction 13, the observer will see the portion of diffuse light 11 that is emitted in his direction because diffuse light 11 is essentially homogenously emitted in all directions from chromatic diffusing layer 5. Clearly, those portions being emitted towards reflective surface sections 3' are reflected and may also be seen when looking at chromatic reflective unit 1. However, in the viewing direction 13 shown in FIG. 2(b), the observer sees primarily the transmitted specular reflected light of light beam 103A (being "yellow" compared to light beam 103 as discussed above due to the scattering of the blue components). In FIG. 2(b), light beam 103 and 103A are illustrated by arrows exemplarily for essentially a single reflective surface section.

However, outside of range 107, the seen specular reflected light is based on that portion of incident not-directed light 9 that is redirected by chromatic reflective unit 1 to face viewing direction 13 of the observer. In general, the redirection may include pure specular reflection as well as the forward scattering addressed before.

The portion of the incident light, which is subject to the essentially Rayleigh-like scattering by the nanoparticles, is emitted in a diffuse manner, thereby leading to substantially homogeneous luminance in all the directions pointing away from its surface. It is noted that the diffuse light is based on the complete luminance to which chromatic reflective unit 1 is subjected from any direction. In other words, all light incident on chromatic reflective unit 1 contributes to the diffuse light, irrespective of the direction under which the light is incident.

As a consequence, the light seen when looking at chromatic reflective unit 1 under a certain direction (such as viewing direction 13 in FIG. 2(b)) comprises a superposition of light being specularly reflected and diffuse light generated by the scattering and being scattered towards the respective direction. As will be apparent, an observer looking onto chromatic reflective unit 1 from some viewing angle may have a perception as if the observer looks into the blue sky in case the chromatic separation provided by chromatic reflective unit 1 includes a "dominant" diffuse light component. However, as will be explained below, a reflection of bright background may affect the sun-sky perception.

Assuming the case of an orientation of the chromatic reflective unit as shown in FIG. 2(c), where chromatic reflective sections 6A, 6B are oriented such that one cannot see the light source. Chromatic reflective sections 6A, 6B may be associated with respective normals n. Depending on the orientation of the normals n, an observer (illustrated by dot 8 in FIG. 2(c)) looking in the direction 13A at chromatic reflective section 6A of chromatic reflective unit 1, may see reflected along a direction 13A' of specular reflection a dark object 10, e.g. sees the dark ground. Consequently, chromatic reflective section 6A appears blue (bluer) to the observer. In fact, the luminance of chromatic reflective section 6A as seen by the observer along direction 13A has a low contribution due to the specular reflection, i.e. a low yellow (long-wavelength) component. For that reason, the main contribution to the luminance of chromatic reflective section 6A along direction 13A is the contribution of the Rayleigh-like scattered light, i.e. the contribution of the light impinging from any direction onto chromatic reflective section 6A, which is eventually scattered against the direction 13A along which the observer is looking.

In contrast, the observer, when looking in a direction 13B at chromatic reflective section 6B of chromatic reflective unit 1, sees reflected along the direction 13B' of specular reflection a bright object 12, e.g. a bright wall. Consequently, the luminance of chromatic reflective section 6B along direction 13B has a strong contribution due to the specular reflection, i.e. a strong yellow (long-wavelength) component. For that reason, the main contribution to the luminance of chromatic reflective section 6B as seen by the observer is the contribution of the reflected light. Consequently, chromatic reflective section 6B appears yellow (less blue) to the observer.

In other words, in certain situations, the following conditions may be given for those sections of the chromatic reflective unit, which should appear sky-like blue:

1. The characteristic of the luminance distribution of the light, which illuminate the chromatic reflective section or the plurality of chromatic reflective sections may change. e.g. in angle and/or intensity over the x-y plane (x-y as defined in FIG. 1). For example, one portion of a chromatic reflective unit may be less illuminated than another or illuminated with different light angular distribution.

2. An observer looking at the chromatic reflective section or the plurality of chromatic reflective sections may see different portions under significantly different viewing angles, this may be, for example, due to possible differences in the orientation of individual sections.

The first and/or the second condition may cause different portions of a chromatic reflective section or different chromatic reflective sections to be seen by the observer in different colors as described above.

As a result, a variation in the brightness of the reflected background may result in a modification of the perceived blue. That contrast in color may result in a perceived image that deviates from the blue sky impression that may be intended. The herein disclosed configurations may allow reducing that influence of bright or non-uniform (in color and/or luminosity) background and maintain some type of sun-sky perception when looking at chromatic reflective unit 1.

FIG. 3 is an illustration for explaining the aspect of the non-coplanar orientation of reflective surface sections 3'.

In general, the shape of a chromatic reflective unit can be associated with a surface-type as in general the shape extends layer-like in two directions. Thus, herein the surface-type is understood as the type of (3D-) surface that a chromatic reflective unit embodies. The surface-type can be of any surface shape such as a planar surface (corresponding to a panel shape of the chromatic reflective unit as illustrated in FIG. 3 in a cross-sectional view) or curved surface (corresponding, for example, to a concave or convex shape of the chromatic reflective unit). The surface-type defines, for example, a planar or curved viewable face of the chromatic reflective unit 1, which is essentially independent of the orientation of the reflective surface sections.

The herein disclosed non-coplanar orientation of the reflective surface sections results, however, to a deviation of their orientation with respect to that surface-type. In general, that deviation can be described using a central plane 17 and a reference plane 19 as introduced below.

In FIG. 3, central plane 17 is indicated. It is representative for the spatial orientation of the non-coplanar reflective surface sections. For example, central plane 17 may be the best fitting plane determined by, for example, the method of linear least squares. As is apparent in view of the reflective feature of chromatic reflective unit 1, central plane 17 has a diffusing layer side 17A facing essentially in the direction of potential incident light. The other side of central plane 17 is a non-illuminated side 17B (in general, non-illuminated side 17B is the side at which the reflective layer limits essentially the propagation of incident light).

Based on central plane 17, a reference plane 19 is selected that is coplanar with respect to a central plane 17 and that is displaced from central plane 17 at diffusing layer side 17A beyond anyone of the plurality of non-coplanar reflective surface sections 3'. Reference plane 19 shown in FIG. 3 is an exemplary plane fulfilling the above conditions. The surface feature of chromatic reflective unit 1 is given by the variation in a distance d between the various points on reflective surface sections 3' and reference plane 19. Exemplary minimum distances 21 for two positions (measured in normal direction to reference plane 19) are indicated in FIG. 3.

In FIG. 3, an exemplary variation in distance d along a straight measurement line in y-direction is schematically indicated as a distance graph 23. With increasing y-position, distance d decreases for reflective surface sections 3' (indicated as section 3' of distance graph 23).

In the saw-like cross-section of chromatic reflective unit 1 shown in FIG. 3, neighboring reflective surface sections 3' are connected by transition surface sections 25. Distance d increases in y-direction for those surface sections 25 as indicated by sections 25' of distance graph 23.

In distance graph 23, several local extrema 27 (local maxima or local minima) indicate the transition of increasing and decreasing sections. As shown, in FIG. 3 distance d increases and decreases at least twice along the measurement line in y-direction. Similarly, the non-coplanar surface configuration is characterized by more than three local extrema (excluding terminal points).

In other words, the shape-analysis of the non-coplanar surface sections with respect to a predefined direction may include the steps: estimating for the reflective surface a best fitting plane with, for example, a linear least squares method; selecting a second plane parallel to the best fitting plane such that the second plane does not intercept with the reflective surface; estimating a distance function of two variables, such as d(x, y), which defines the distance between a specific point (x, y) on the second plane and the intercept with the reflective surface along a straight line orthogonal to the second plane at the point (x, y) (in case of multiple intercepts with the reflective surface, selecting the shortest distance as the value of the distance function d(x, y)); and selecting a section r(q) from d(x, y) wherein the section is the intersection of the distance function d(x, y) with a given plane perpendicular to the second plane. The distance requirement is then that the distance in dependence of the variable q has more than three local extrema (excluding terminal points) for at least one given section r(q).

For completeness, for a panel shaped chromatic reflective unit 1 (planar surface type), the saw-tooth like distance d development may be essentially unchanged and repeat itself over the complete extent of the chromatic reflective unit 1, while for a curved surface type, the distance d development may approach or veer away towards the boarder of the chromatic reflective unit as will be apparent to the skilled person.

Various embodiments of chromatic reflective units 1 with respect to the configuration of the non-coplanar reflective surface sections and the chromatic diffusing layer are exemplary described in connection with FIGS. 4 to 6 for sandwich-type configurations.

In FIG. 4, an embodiment of a chromatic reflective unit 1A is shown that comprises a chromatic diffusing layer 5A with a planar front side 31A (or a front side surface extending essentially as the base shape of the chromatic reflective unit) and a respectively shaped back side 31B. Reflective surface sections 3' of reflective layer 3 are non-coplanar as described above. Accordingly, a gap volume 33 extends between planar back side 31B and reflective surface sections 3' that varies in thickness.

In the embodiment of FIG. 4, back side 31B of chromatic diffusing layer 5A extends parallel to front side 31A. Accordingly, chromatic diffusing layer 5A has a back side 31B provided at the side of reflective surface sections 3', while front side 31A will be illuminated by incident light 9 (see FIG. 2).

In the exemplary embodiment of FIG. 4, chromatic diffusing layer 5A is constant in thickness and gap volume 33 may comprise some (essentially transparent) filling such as air or some filling material (indicated by dashed line 35 for the three lower gap volumes 33) such as the material of a nanoparticles 37 embedding matrix 39. In the embodiment of FIG. 4, the number of nanoparticles per unit surface area is maintained constant in y-direction. Depending on the size, a refractive filling material may provide an additional chromatic dispersive effect that—depending on the configuration and viewing distance—may be acceptable.

In alternative embodiments, the chromatic diffusing layer may also extend into gap volume 33, thereby providing an inhomogeneous thickness and an in y-direction varying number of nanoparticles per unit surface area. This may also generate modulations in color that may in some configurations be acceptable, in particular in dependence of the shape of gap volume 33 and the viewing distance.

Similar to FIG. 2, reflective layer sections 3' of FIG. 4's embodiment may be provided on a side of a substrate 7 that is saw-like shaped in cross-section. Reflective layer 3 may be formed on—additionally to reflective layer sections 3'—the transition surfaces between reflective layer sections 3'. However, the transition surfaces do not need to be part of the reflective surface sections, in particular in applications having a preset observation direction, from which an observer cannot see the transition surfaces.

For illustrating a further sandwich-type embodiment, FIG. 5 shows a chromatic reflective unit 1B that comprises a plurality of chromatic diffusing layer sections 41 (of chromatic diffusing layer 5B) being respectively associated and applied on reflective surface sections 3' of the plurality of non-coplanar reflective surface sections.

As indicated in FIG. 5, a thickness of each chromatic diffusing layer section 41 is constant. Accordingly, a respective front side section of front side 31A is essentially oriented like the respective reflective surface section and front side 31A is shaped according to the shape of substrate 7. In FIG. 5's cross-sectional view, the front side sections and the reflective surface sections are exemplarily planar.

Like in the embodiment of FIG. 4, assuming homogeneous physical microscopic properties of chromatic diffusing layer 5B, a homogeneous scattering effect is given for the incident light.

With respect to the manufacturing of chromatic reflective unit 1B, the specific embodiment of FIG. 5 is based on a pair of metal layers 43A. 43B spaced apart by a polymer 45—acting as a support structure. Metal layer 43B forms the basis for the reflective layer sections 3'. The structure of FIG. 5 can be manufactured by deforming an initially planar sandwich structure comprising the metal layers 43A, 43B and polymer 45 in a manner that the required non-coplanar shape is given. Chromatic diffusing layer 5B may be applied before or after deformation.

FIG. 6 shows an alternative embodiment of a chromatic reflective unit 1C. Similar to the embodiment of FIG. 5, the structure comprises—as a support structure—a sandwich of two metal layers 43A, 43B and a polymer 45 as an example of a core layer.

In contrast to the embodiment of FIG. 5, the embodiment of FIG. 6 does not deform the complete sandwich structure but instead imprints a desired surface structure on metal layer 43B. In some embodiments, metal layer 43B may provide the reflective feature, thus be the reflective layer. In other embodiments, a specific reflective layer may be provided on metal layer 43B. The chromatic diffusing layer may be applied before or after imprinting and is not explicitly referenced in FIG. 6. In general, imprinting may allow for a small sized structure in comparison of any mechanical bending such as underlying, for example. FIG. 5's embodiment.

Depending on the use. e.g. if the chromatic reflective unit will be illuminated from both sides, also first metal layer 43A may be imprinted and coated to provide the plurality of non-coplanar reflective surface sections.

In summary, sandwich-structures shown in FIGS. 4 to 6 comprise a sequence of surface sections, in particular formed on an illumination-sided stabilizing layer, that are inclined with respect to the base surface-shape of the chromatic reflective unit, and form the basis for the reflective surface section and the chromatic diffusing layer provided thereon.

As mentioned above, chromatic diffusing layer 5 may be a coating or film that has a thickness of, for example, about 0.2 mm or less such as 0.1 mm or less or even 0.05 mm or less. Moreover, the coating or film may be deposited onto the reflecting surface sections prior or after providing their respective non-coplanar shape.

For completeness, in addition to nanoparticles 37, larger light-scattering centers may be embedded within the chromatic diffusing layer or, for example, the filling material of gap volume 33. Those additional light-scattering centers may have an average size larger than Rayleigh-active nanoparticles 37, for example in the range of 1 μm or more such as larger than about 5 μm. The additional light-scattering centers may provide—in addition to the above discussed Rayleigh-like diffuse scattering by Rayleigh-active nanoparticles 37—a blurring effect that effects the specular reflected component to be deviated from the pure specular reflection in a forward "scattering" cone.

As will be apparent to the skilled person, an analogue blurring effect may be generated by providing micro-roughness on the chromatic diffusing layer, for example, on the illumination side and/or by providing the reflective surface, instead of with a perfectly glossy finishing, with a rough finishing (such as those available in commercial products such as some type of coil-coated high-reflective metal sheets) configured to provide diffusion of reflected light within a cone of about 3° or more such as 5° or more or even 10° or more.

Methods for applying the reflective layer and/or the chromatic diffusing layer include metal vacuum deposition, molecular beam epitaxy, plasma coding, spraying, inkjet methods, film splitting, or the like.

In some embodiments, a metal layer can be used as reflective layer such as an aluminum metal mirror foil with reflectivity larger than 95% or even larger than 98%.

FIG. 7 illustrates a modular configuration of a chromatic reflective unit 1D. Modular units may in particular be relevant for outdoor application, where they are mounted to a building. In that context, chromatic reflective units are also referred to herein as chromatic reflective structural units in reference to their use at a building structure. Modular embodiments may allow the formation of large scale chromatic reflective units.

Chromatic reflective unit 1D comprises a mounting structure 49 with a series of mounting protrusions 49A. Mounting structure 49 may provide a back frame to be mounted, for example, to a wall of a building.

In some embodiment, mounting structure 49 may extend grid wise in an x-y-direction. Accordingly, a normal 51 to the x-y plane characterizes a viewable face 50 of the surface base shape (in this case panel shape) of chromatic reflective unit 1D.

A sequence of chromatic mirror units 53 are mounted to mounting protrusions 49A. The mounting is performed such that each chromatic mirror unit 53 is inclined with respect to viewable face 50. Specifically, as indicated in FIG. 7 a panel normal 55 of each mirror unit 53 is inclined by an inclination angle α in (negative) y-direction with respect to normal 51.

The chromatic mirror units 53 are displaced with respect to each other in y-direction and are oriented with respect to normal 51 in essentially identical manner.

Each chromatic mirror unit 53 comprises a reflective surface section covered by a chromatic diffusing layer section. Accordingly, the reflective surface sections contribute to a non-continuous reflective surface of chromatic reflective unit 1D.

Figure 8:
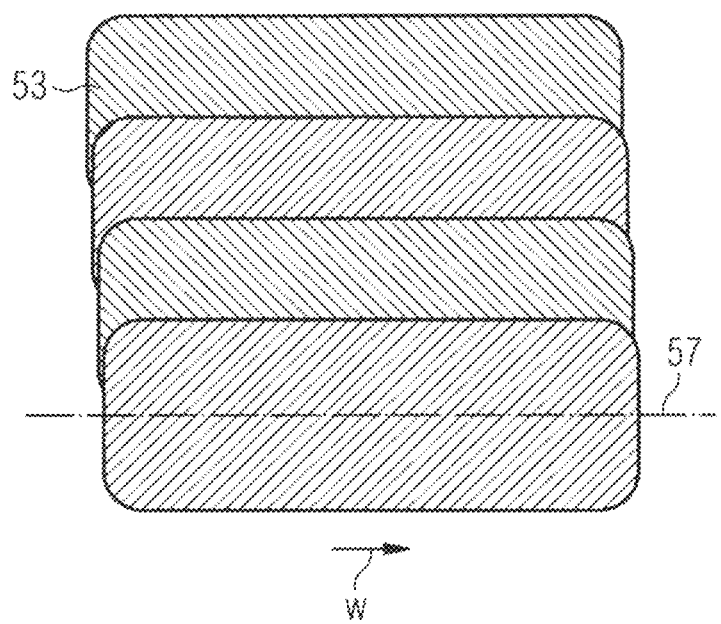

Referring to FIG. 3, also for chromatic reflective unit 1D, central plane 17 can be determined, in this embodiment extending through the center lines 57 indicted in FIG. 8 for one of the chromatic mirror units 53. Furthermore, also reference plane 19 can be selected in the required manner and a distance graph 23' of a non-continuous development of the distance of the reflective surface sections with respect to reference plane 19 is given. Again, more than three local extrema 27 are associated with the specific 3D-shape of the non-coplanar reflective surface sections provided by chromatic mirror units 53 of chromatic reflective unit 1D.

FIG. 8 shows a top view of a set of exemplary four chromatic mirror units 53 of chromatic reflective unit 1D under a viewing angle. As illustrated, the viewing angle does not allow seeing each chromatic mirror unit 53 completely because some portion of the same are covered by the neighboring one. Accordingly, when looking at chromatic reflective unit ID under the viewing angle, an observer will see a continuous mosaic-like surface comprised of portions of chromatic mirror units 53, i.e. portions of reflectors covered by chromatic diffusing layer sections.

FIG. 8 illustrates further a rectangular base shape for the chromatic mirror units 53, wherein the corners are curved for improving the illustration. However, also, for example, rectangular corners may be provided.

Figure 9:
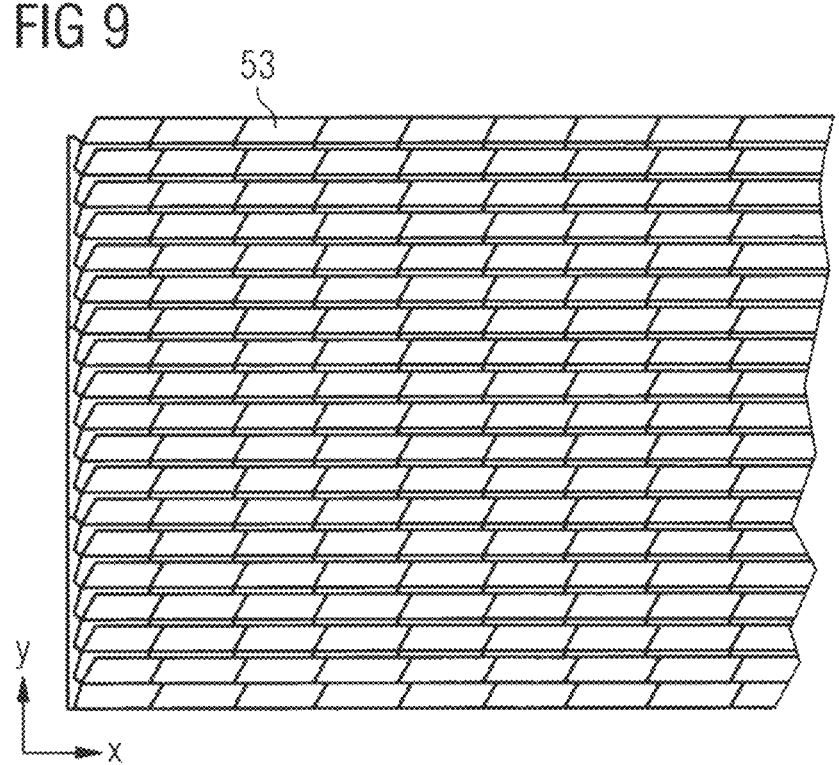

FIG. 9 illustrates a schematic 3D-view of chromatic reflective unit 1D. As can be seen, chromatic mirror units 53 form a sequence in y-direction as well as in x-direction. Accordingly, chromatic reflective unit 1D extends in x-y-direction over, for example, rectangular areas of several meters in x- and y-direction.

FIGS. 7 to 9 illustrate an embodiment where at least a subgroup of the plurality of non-coplanar reflective surface sections is formed by a sequence of reflective surface sections having essentially an identical shape and an identical orientation in space. Thereby, the subgroup's reflective surface sections are displaced with respect to each other to form a mosaic-like assembly of reflective surface sections.

As chromatic reflective unit 1D comprises a surface-like base shape with viewable face 50, and the reflective surface sections themselves have surface-like shapes characterized by a width direction and a height direction, the embodiment of FIG. 7 illustrates that essentially a width direction w of the reflective surface sections extends along viewable face 50 (specifically along x-direction), while a height direction h extends under an inclination angle with respect to viewable face 50, i.e. out of the x-y-plane.

Chromatic mirror units 53 may each comprise a reflective surface section covered by a chromatic diffusing layer section.

In some embodiments, each reflective surface section is provided on a support board such as a planar plastic such as polymeric, or glass board and has supplied thereon the chromatic diffusing layer section; all support boards together with, for example, mounting structure 49 may be considered as defining a support structure providing non-coplanar surface sections. In other embodiments, the chromatic diffusing layer section is configured strong enough to act as the support for the reflective layer; then all chromatic diffusing layer sections together with, for example, mounting structure 49 form a support structure providing a plurality of non-coplanar surface sections on which a reflective layer is formed.

Figure 10:
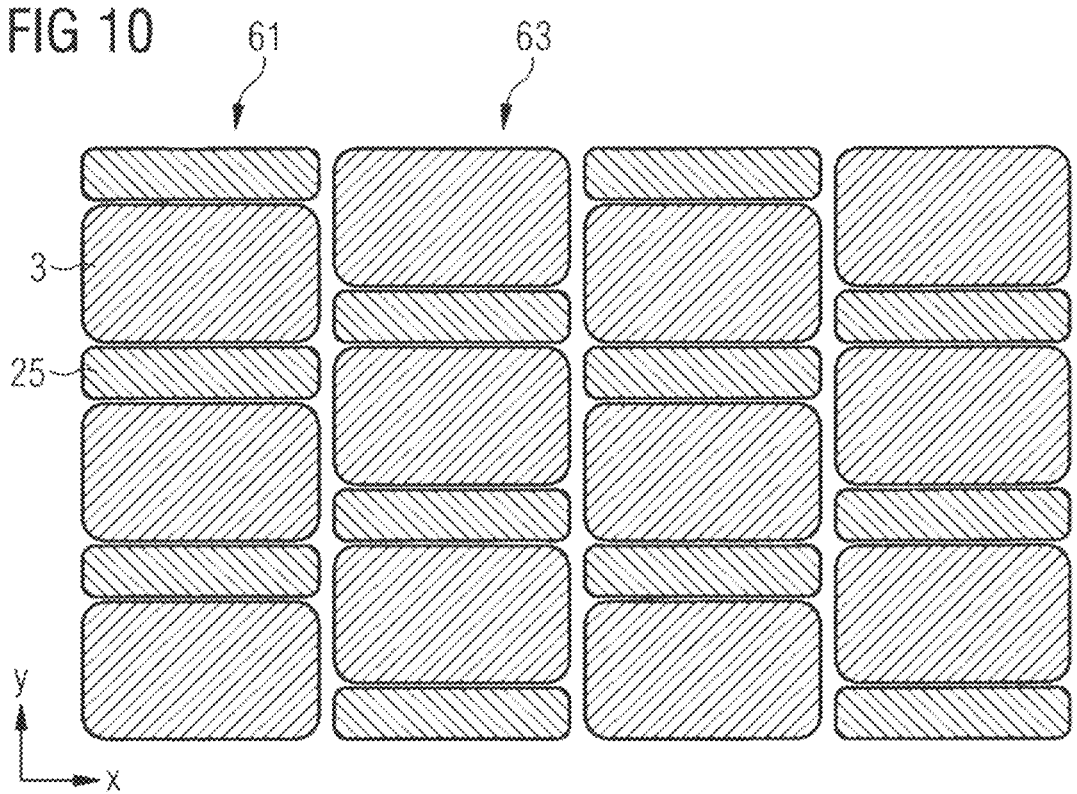
FIGS. 10 and 11 are schematic top views illustrating exemplary arrangements of a plurality of reflective surface sections.
Figure 11:
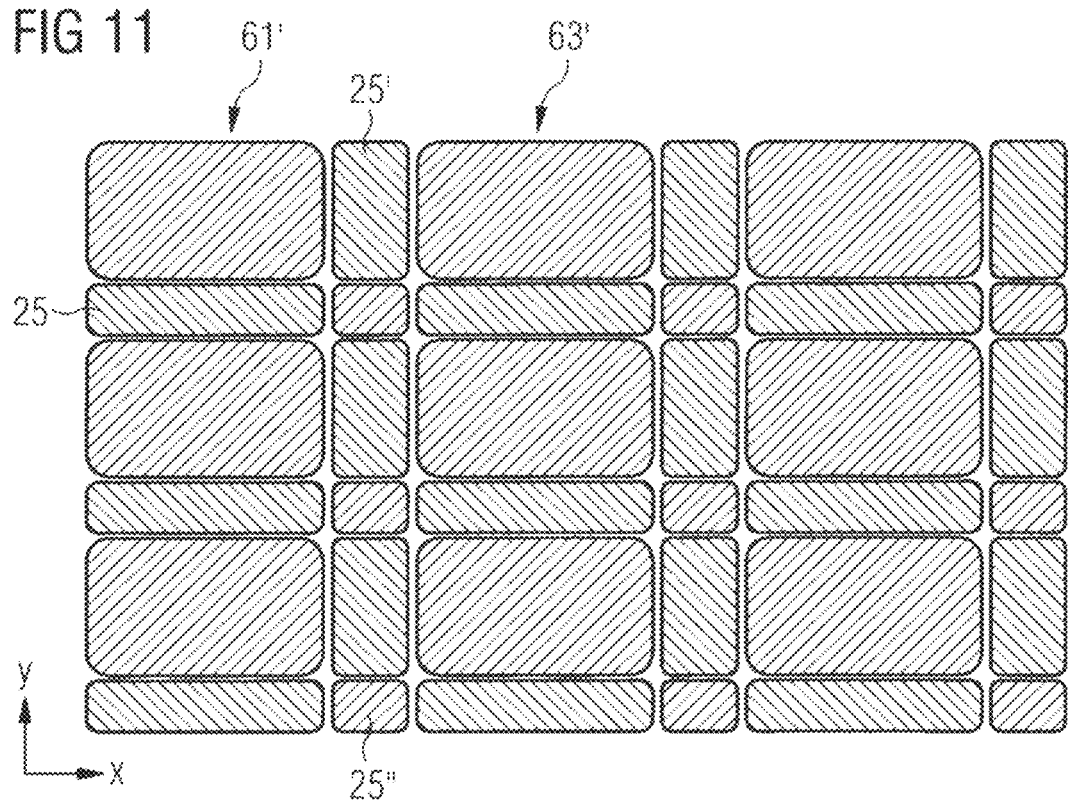

FIGS. 10 and 11 are schematic top views illustrating exemplary arrangements of a plurality of reflective surface sections. Specifically, FIG. 10 illustrates an embodiment for an imprinted surface structure that comprises sequences of reflective surface sections 3' that are separated by transition surface sections 25 in y-direction. In y-direction displaced reflective surface sections 3' form a first subgroup 61 of reflective surface sections that may have a first type of inclination. Shifted in x-direction, a second subgroup 63 of reflective surface sections 3' may provide a sequence having reflective surface sections with a different inclination. Shifted again in x-direction, there is a further subgroup of reflective surface sections 3' that extends in y-direction and may differ again in inclination or have one of the inclinations of the previous subgroups 61, 63.

Accordingly, the embodiment of FIG. 10 illustrates the possibility to form a mosaic-like structure with a variety of different subgroups of reflective surface sections having identical or different orientation in space.

The embodiment of FIG. 11 has additionally transition surfaces in between rows (subgroups, sequences) such as exemplary shown transition surface sections 25' and 25" between subgroup 61' and subgroup 63'. The additional transition surface sections may be caused by the respective manufacturing process and may contribute themselves to the scattering/reflection features, thereby, for example, supporting the breaking up of any reflected image.

In summary, referring to FIGS. 10 and 11, the plurality of reflective surface sections may be orientated with respect to the surface base shape to form a step-like sequence of reflective surface sections having identical and/or varying step shapes including identical and/or varying sizes, angles, and shapes—such as plane or curved shapes discussed below.

FIGS. 12 to 15 are schematic cross-sections of chromatic reflective units illustrating embodiments with non-planar reflective surface sections.

Figure 12:
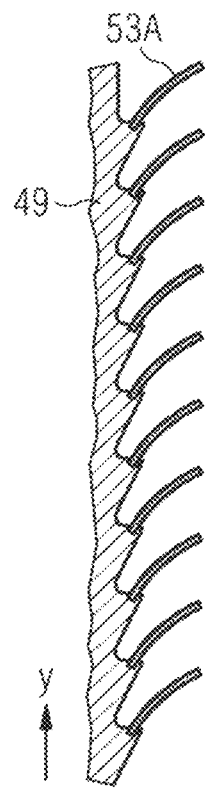
FIGS. 12 to 15 are schematic cross-sections of chromatic reflective units providing non-planar reflective surface sections.

Specifically, FIG. 12 shows an alternative to the embodiment of FIG. 7 wherein, in a modular configuration, the planar chromatic mirror units 53 of FIG. 7 are replaced by concave mirror units 53A—having, for example, a configuration as described above in connection with FIGS. 7 to 9. The concave shape is given in the plane of the cross-section given by the y-direction, while the shape in the x-direction (or generally along another direction defined by the surface-like base shape of the chromatic reflective unit) may be un-curved or follow the respective surface-like base shape. As will be apparent to the skilled person, the concave shape results in a (one-dimensional) focusing feature of each chromatic mirror unit and, thus, the chromatic reflective unit in general. For example, the configuration of FIG. 12 can focus an illuminating light beam or independently focus portions of the light beam selected by reflective surface sections in one direction, or also have broadening effects depending on curvature.

Figure 13:
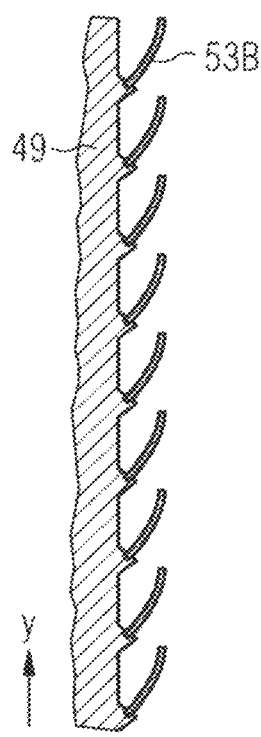

In contrast, the embodiment of FIG. 13 uses convex chromatic mirror units 53B. Convex chromatic mirror units 53B may have, for example, a configuration as described above in connection with FIGS. 7 to 9 and cause a defocusing and accordingly associate, for a specific observer position, a viewing direction 13 (see FIG. 2) with a plurality of directions of the incident light 9. Thereby, a broadening of the reflected light beam in case of directional illumination (e.g. sun illumination), and hence a smoothing of the illuminance on the ground may be achieved.

Figure 14:
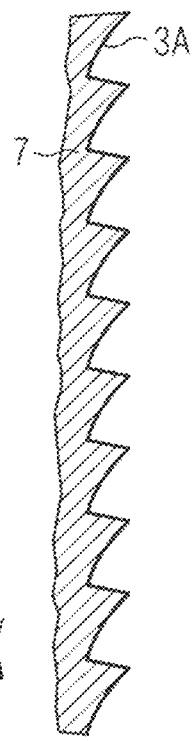
Figure 15:
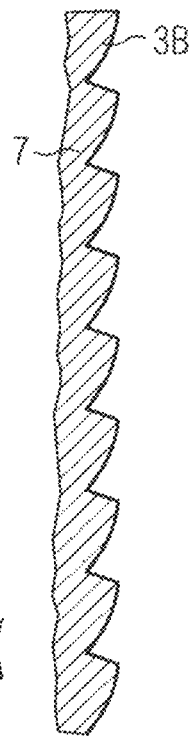

FIGS. 14 and 15 illustrate, for sandwich-type configurations, embodiments similar to the ones of FIGS. 12 and 13.

In principal, sandwich-type configurations, and in particular surface imprinted structures, allow a very flexible formation of non-planar reflective surface section. The non-planar shapes may generally be varied in x- and/or y-direction or generally over the complete viewable face 50. Thereby, on a small scale, a mosaic-like structure can be provided with the optical effects discussed in connection with FIGS. 12 and 13.

Figure 16:
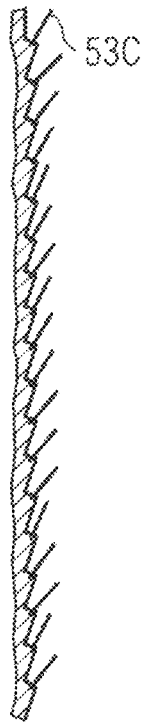
FIGS. 16 to 18 are schematic cross-sections of a chromatic reflective unit providing subgroups of reflective surface sections, a chromatic reflective unit providing randomized oriented planar surface sections, and a chromatic reflective unit providing randomized oriented concave surface sections, respectively.
Figure 17:
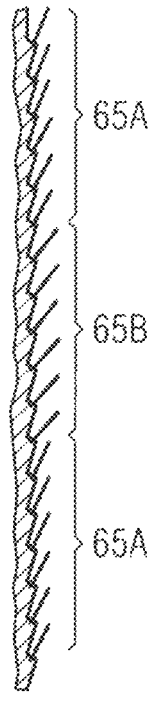
Figure 18:
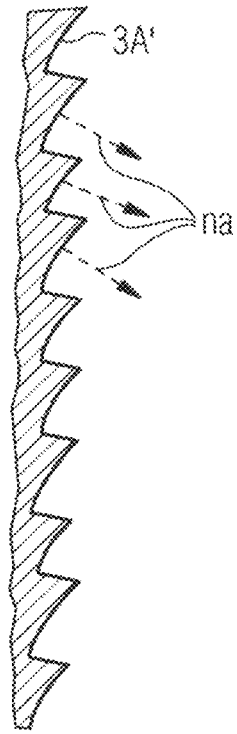

FIGS. 16 to 18 illustrate the flexibility that is available for orienting reflective surface structures for modular configurations and sandwich-type configurations.

For example, FIG. 16 illustrates an embodiment in which chromatic mirror units 53C are inclined with respect to y-direction in a random manner. The random orientation of the various chromatic mirror units 53C provides for a breaking of the mirrored image because an observer sees, for a specific viewing direction, various sections of the incident light (see also discussion in combination with FIG. 23).

A more regular configuration of chromatic mirror units is shown in FIG. 17, which includes alternating subgroups 65A, 65B in y-direction, each having a respective orientation/inclination. Thereby, configurations are possible that specifically link a viewing direction with two regions of the incident light. In illuminated configurations with essentially a single incident direction, this aspect allows to provide the sky-sun impression at various observer locations.

FIG. 18 illustrates a configuration in which a random-like orientation is combined with a concave configuration of the reflective surface sections 3A'. The embodiment combines the aspect of focusing (or alternatively defocusing) with both the effects of randomness and broadening.

FIG. 18 illustrates further the concept of an associated (section) normal na for curved surface sections—in analogy to planar surface normals (which are considered to be an associated normal within the herein disclosed concepts). In principle, for an incident beam, also a curved surface will generate a reflected beam that can be associated with a main beam direction after the reflection. That main beam direction and incident beam direction define the associated normal. As shown in FIG. 18, also for a random-like orientations, the associated normal na are non-parallel. If the maintenance of some beam like behavior is intended, a range of possible directions into which the associated (section) normals na point may extend around a subgroup inclination angle. The subgroup inclination angle refers herein to those reflective surface sections that are contributing the visual perception and relates to the surface type of the chromatic reflective unit. The subgroup inclination angle may be in the range from, for example, about 2° to about 88°, in particular in the range from about 5° to about 60° such as in the range from about 10° to about 30°. In general, associated normals na are inclined with respect to a unit normal that is associated with a respective portion of a surface-type of the chromatic reflective unit by inclination angles. For a given inclination direction (e.g. x or y direction or any other direction relating to the surface type), inclination angles of the associated normal na may be within an angular range up to, for example, about 30° with respect to the subgroup orientation direction such as within an angular range of up to about 20°, 10°, or 5°. In some embodiments, inclination angles of the associated normal na may not be limited with respect to the subgroup orientation direction, thereby allowing implementations for a larger potential incident angles of, for example, an incident light beam emitted by the light source. In some embodiments, as an approximation, the associated normal could be the normal to the best fitting plane of the respective surface section.

For example, the inclination angles associated with respective chromatic reflective sections in FIGS. 12 to 18 may be in the range from about 2° to about 80° such as in particular in the range from about 10° to about 40°.

Moreover, the above discussed configuration illustrate the possibility to provide—with respect to a single one of the respective surface sections or with respect to a plurality of reflective surface sections—a constant or varying scattering characteristic, a constant or varying nanoparticle distribution, and/or a constant or varying inclination angle of the reflective surface sections. Those aspects affect the chromatic feature of the chromatic reflective units for specific viewing directions.

In the following, exemplary application of chromatic reflective units are described, in particular with respect to illumination concepts. In general, the herein described chromatic reflective units may extend over areas of several square centimeter (e.g. for localized illumination configurations), up to several 100 square centimeter, up to even several square meters for large scale illumination configurations.

FIG. 19 shows exemplary embodiments of panel shaped chromatic mirror units 53 as they can be used in chromatic reflective units such as shown in FIG. 7.

Specifically, FIG. 19(a) illustrates a glass panel based chromatic mirror unit 53C. The glass panel 71, for example a safety glass panel, forms a part of the support structure of a chromatic reflective unit and has a reflective layer 73 applied on one side and a chromatic diffusing layer 75 applied on the other side. The mirror unit may comprise, for example, through holes 77 for attaching the mirror unit to a grid configured for mounting mirror unit 53 under the desired inclination.

In alternative embodiments, glass panel 71 may be replaced by transparent panels made of, for example, a polymeric, e.g. an acrylic, polycarbonate. PVC or the like material. Respective non glass materials may simplify the mounting and reduce the weight of chromatic mirror unit 53C.

In FIG. 19(b), a further alternative configuration of a sandwich structure based mirror unit 53D is shown. Mirror unit 53D comprises a mount-sided stabilizing layer 79, a core layer 81, and an illumination-sided stabilizing layer 83 thereby forming a composite panel such as an aluminum composite panel that forms a part of the support structure of a chromatic reflective unit. The reflective layer sections 3' may be provided by the illumination-sided stabilizing layer 83 itself (e.g. by an aluminum layer) or they may be applied separately thereon by a reflective layer. A chromatic diffusing layer 85 is then applied onto illumination-sided stabilizing layer 83 or that reflective layer.

In the following, the perception of an illuminated chromatic reflective unit as disclosed before is illustrate for exemplary embodiments.

Figure 20:
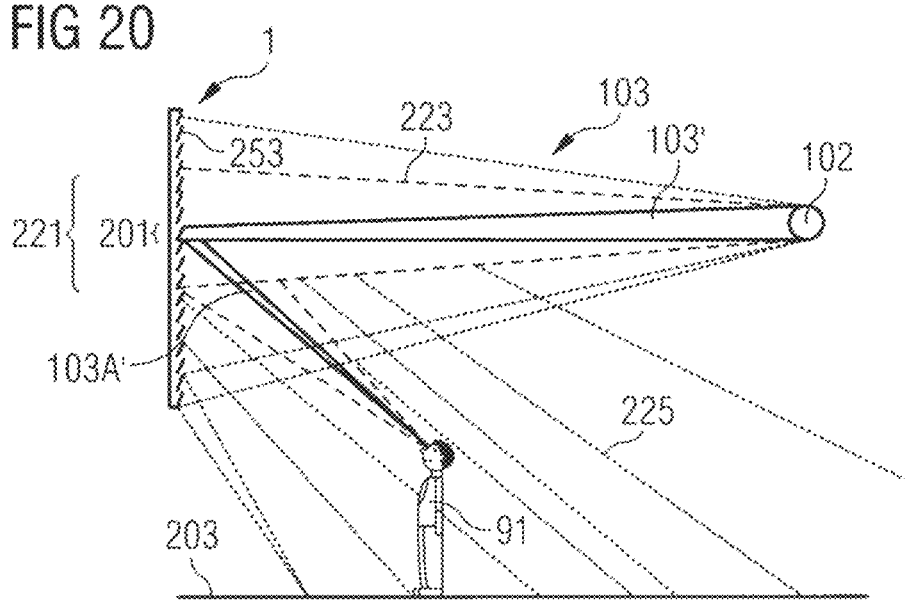
FIG. 20 is a schematic illustration of a perceptive situation for an observer.
Figure 21:
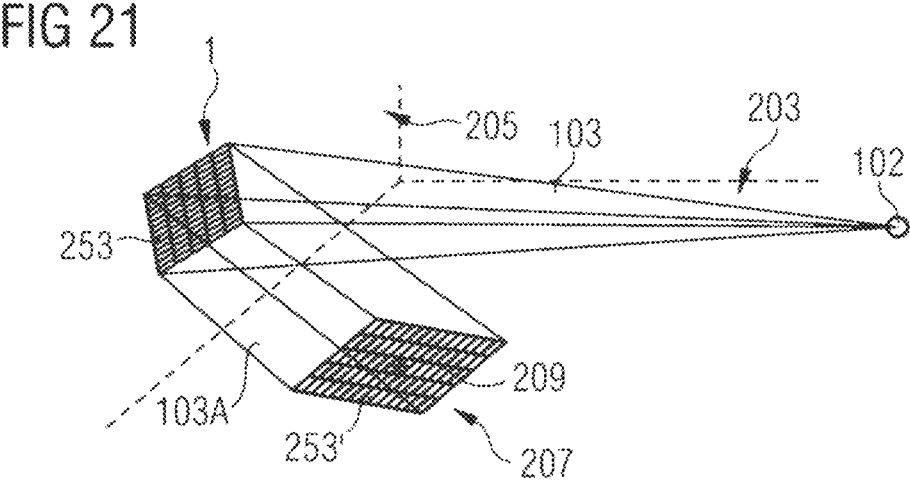
FIG. 21 is a 3D-illustration of light beam propagation in case of plane-parallel oriented reflective surface sections.
Figure 22:
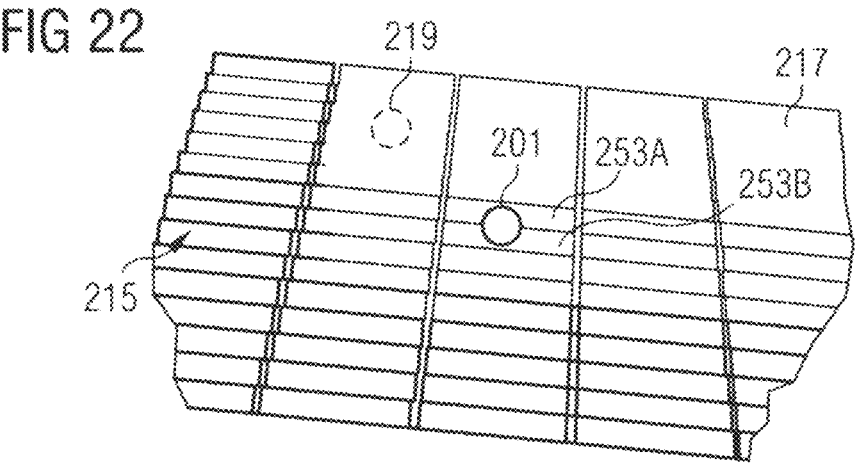
FIG. 22 is an illustration of the appearance of the chromatic reflective unit of FIG. 21 from within the reflected light beam.

FIG. 20 is a schematic illustration of a perceptive situation for an observer 91 of a chromatic reflective unit 1 that is illuminated by light projector 102. Specifically, FIG. 20 illustrates—in solid lines—the perception of light projector 102 for the case of a chromatic reflective unit 1 comprising plane-parallel mirror units 53 as also illustrated in FIGS. 21 and 22. In addition, FIG. 20 illustrates—in dashed and in dotted lines—the perception of light projector 102 for randomly orientated plane mirror units as also illustrated in FIGS. 23 to 26.

Referring to the configuration of plane-parallel mirror units 253, observer 91 sees a localized bright spot 201. At bright spot 201, a portion 103' of a light beam 103 emitted from light projector 102 falls onto one (or a group of) mirror unit 253 that is inclined with respect to the plane of the in this exemplary embodiment panel shaped chromatic reflective unit 1 (it is assumed that mirror units 253 comprise planar reflective surfaces sections). The inclination is such that the light of portion 103' is specularly reflected towards observer 91 (indicated as portion 103A' in FIG. 20). The size of bright spot 201 depends on the divergence of light beam 103, the distance between light projector 102 and chromatic reflective unit 1, and the distance between observer 91 and chromatic reflective unit 1.

In FIG. 21, the propagation of light beam 103 emitted from light source 102 onto a chromatic reflective unit 1 mounted at a wall 205 of a to be illuminated room is illustrated. As an example, light beam 103 is shown to be adapted in size to the size of chromatic reflective unit 1. In general, also smaller or larger light beams may be used, potentially, for example, with a less convincing sun-sky imitation. Illuminating light beam 103A is determined by the shape of chromatic reflective unit 1 and the divergence of the beam. In FIG. 21, light beam 113A creates a specific illuminated area 207 on a ground 203 of the to be illuminated room. Illuminated area 207 in FIG. 21 corresponds to range 107 of a visible sun location illustrated in FIG. 1. Assuming that chromatic reflective unit 1 comprises only plane-parallel mirror units 253, illuminated area 207 consists of fields 253' (light spots) originating from respective mirror units 253.

For illustration purposes, a grid structure is superimposed on illuminated area 207 to illustrate that association of respective mirror units 253 with respective illuminated regions 253'.

As exemplarily shown in FIGS. 20 and 22, bright spot 201 is located in the center of chromatic reflective unit 1 because observer 91 is positioned approximately in the center of illuminated area 207: a respective position 209 is indicated in FIG. 21. When looking from that position 209 onto chromatic reflective unit 1, chromatic reflective unit 1 will appear as shown in FIG. 22. Specifically, observer 91 sees bright spot 201 in the center of chromatic reflective unit 1. Outside of bright spot 201, chromatic reflective unit 1 appears, for example, sky-blueish. That sky-like appearance is due to the diffuse scattered light originating from interaction of light beam 103 with the nanoparticles. The diffuse light contributes to the main light being perceived by observer 91 because the conditions for the reflection of light beam 103 outside of bright spot 201 are such that light of light beam 103 is reflected not towards observer 91 but towards the remaining areas of illuminated area 207.

As shown exemplarily in FIG. 22, bright spot 201 extends over two mirror units 253A, 253B. It appears sun-like assuming a respective quality of light protector 102 and a respective homogeneity of the blueish appearance of those mirror units 253 next to the bright spot 201, i.e. looked at not under the specular reflective angle associated with mirror units 253A and 253B.

Exemplarily, FIG. 22 further illustrates the influence of variations in brightness of those background areas that are mirrored to observer 91 via chromatic reflective unit 1. Exemplarily, FIG. 22 shows an L-shaped darker (i.e. having a more intense blue tone) region 215 that may be caused, for example, by specular reflection contributions from a dark corner of the room. In other words, the diffuse light emitted by the respective chromatic diffusing layers of the mirror units may comprise a lower contribution of directly reflected background light for that region 215. In contrast, brighter regions 217 of chromatic reflective unit 1 may comprise a larger amount of specularly reflected background light that is superimposed on the blue scattered light and, thus, results in a light blue perception of those regions 217. Accordingly, the background light present in the room may result in variations in the blueish appearance of chromatic reflective unit 1 and may affect the sun-like appearance of bright spot of 201.

Referring, for example, to the embodiment illustrated in FIG. 11, the orientation of mirror units 53 may not need to be plane-parallel for all mirror units 253. For example, neighboring rows of mirror units 253 may be inclined differently. To illustrate such a configuration of chromatic reflective unit 1, a second bright spot 219 is schematically indicated in FIG. 22 by a dashed circle. In this case, it is assumed that the inclination of the respective mirror units 253 in the second row is such that observer 91 will also see light source 102 at that second position of second bright spot 219.

In general, embodiments with varying inclinations such as illustrated in FIG. 17 may result in (partly overlapping) lit up regions on the ground. Thus, an observer when moving across the room may pass regions where he sees no sun imitation, one sun imitation, or multiple sun imitations as will be apparent to the skilled person.

The second configuration illustrated in FIG. 20 relates to randomly orientated mirror units as illustrated, for example, in FIG. 16.

Due to the randomness of orientation of the mirror units, observer 91 may have the chance to see light projector 102 over an enlarged region 221 on chromatic reflective unit 1. For that purpose, it is assumed that the randomness in inclination angles as limited to some angular range in one or two directions. The angular range results in orientations of mirror units within enlarged region 221 that reflect respective portions of light beam 103 towards observer 91 as indicated by dashed lines 223 in FIG. 20. The random orientation of the mirror units outside enlarged region 221 creates reflected beam portions passing by observer 91 as indicated by dotted lines 225.

Figure 23:
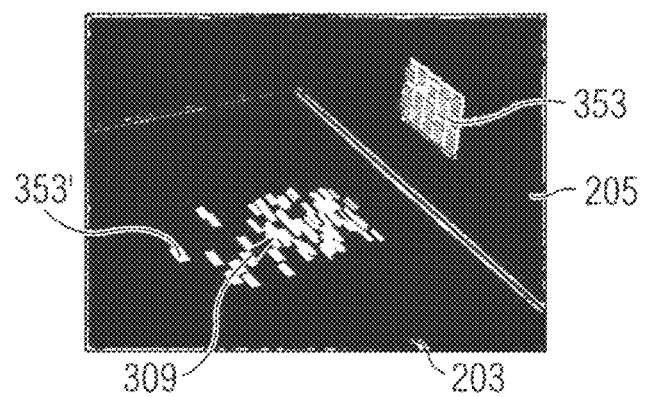
FIG. 23 is a 3D-illustration of the illumination of a room in case of a chromatic reflective unit having randomly oriented plane reflective surface sections.

FIG. 23 illustrates the illumination of a room for such a random orientation of mirror units 353. Respective illuminated fields 353' are no longer aligned with respect to a grid but instead are randomly distributed on ground 203. Depending on the position of observer 91 within this scattered field of lit up areas 353', observer 91 may see (portions of) reflections of light source 102 in mirror units 353.

Figure 24:
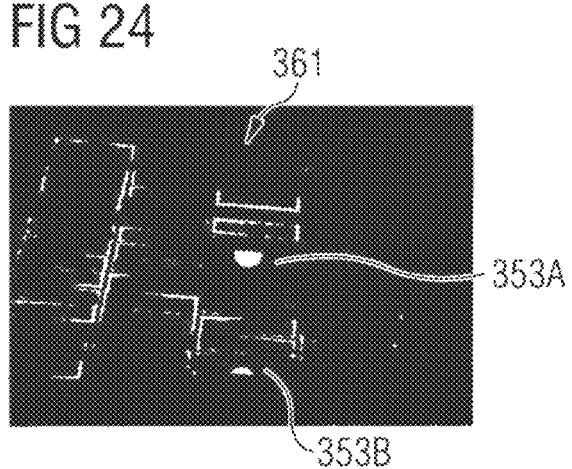
FIG. 24 is an illustration of the appearance of the chromatic reflective unit of FIG. 23 from within the reflected light beam.

As an example, FIG. 24 illustrates the case of an observer position for which the inclination of two spatially separated mirror units 353A and 353B is such that in each mirror unit 353A. 353B a portion of light source 102 is seen by observer 91. A respective position 309 is indicated in FIG. 23. Exemplarily, mirror units 353A and 353B belong to a central row 361 of mirror units. Depending on the distances of the observer from chromatic reflective unit 1 and of chromatic reflective unit from the light source 102, light source 102 is perceived larger or smaller and, thus, the reflected image may extend beyond a border of a mirror unit 353.

For completeness it is noted that the grey scale representation of FIG. 24 indicates again that the perceived blueish tone may vary for different mirror units 353. Again this may be caused by the contribution of specularly reflected background light.

In connection with FIGS. 25 and 26, a chromatic reflective unit 1 comprising randomly orientated and convex shaped mirror units 453. Exemplarily, mirror units 453 are convex curved in x- and y-direction.

In principle, the convex shape will reduce the size of the bright spot on each of mirror units 453 because only a smaller area on each mirror unit will fulfill the specular reflection conditions that allow observer 91 to see light projector 102. However, to counteract that effect of a reduced size of the sun imitation, some small angle scattering is included mirror units 453. Small angle scattering may, for example, be generated by a rough surface and/or by additional micrometer scale scatterers as disclosed above. As a consequence, each sun spot appears larger but less bright as shown in FIGS. 26(a) and 26(b).

Moreover, due to the convex curved shape, the random orientation and the small angle scattering, the beam portions associated with each of mirror units 453 may partially overlap, thereby creating an essentially continuously illuminated area on ground 203. A line 407 of constant brightness is indicated in FIG. 25, defining essentially the shape and extent of that illuminated area.

In addition, due to the random orientation, the perceived position of the bright spots on each mirror unit 453 varies across chromatic reflective unit 1. For same mirror unit, the inclination may provide a condition of specular reflection on the left side, in another on the right side. Assuming a second inclination, the condition may be given on the top or at the bottom of a mirror unit 453.

In FIG. 26(a), observer 91 is positioned centrally within the range of visible sun locations. Accordingly, observer 91 may see for some configurations of the observer-unit-source distances as well as pupil and unit sizes, a "sun" reflection essentially on each mirror unit 453 (this gives the perception of a large fragmented sun angularly covering the angular size of the chromatic reflective unit). In contrast for the same configuration, in FIG. 26(b), observer 91 is positioned at the side of the range of visible sun locations such that despite the curvature of mirror units 453, some of the mirror units do no longer fulfill the condition for specular reflection of light beam 103 into the eye of observer 91 (this gives the perception of a large fragmented sun partly entering the chromatic reflective unit). Respective positions 409A and 409B are indicated in FIG. 25.

The multiple "sun" reflections on chromatic reflective unit 1 are each surrounded by a blue appearance due to diffuse scattered light. They may appear to observer 91, for example, as reflections of the sun light on an irregular surface such as reflections of sun light on the waves on a lake.

Figure 27:
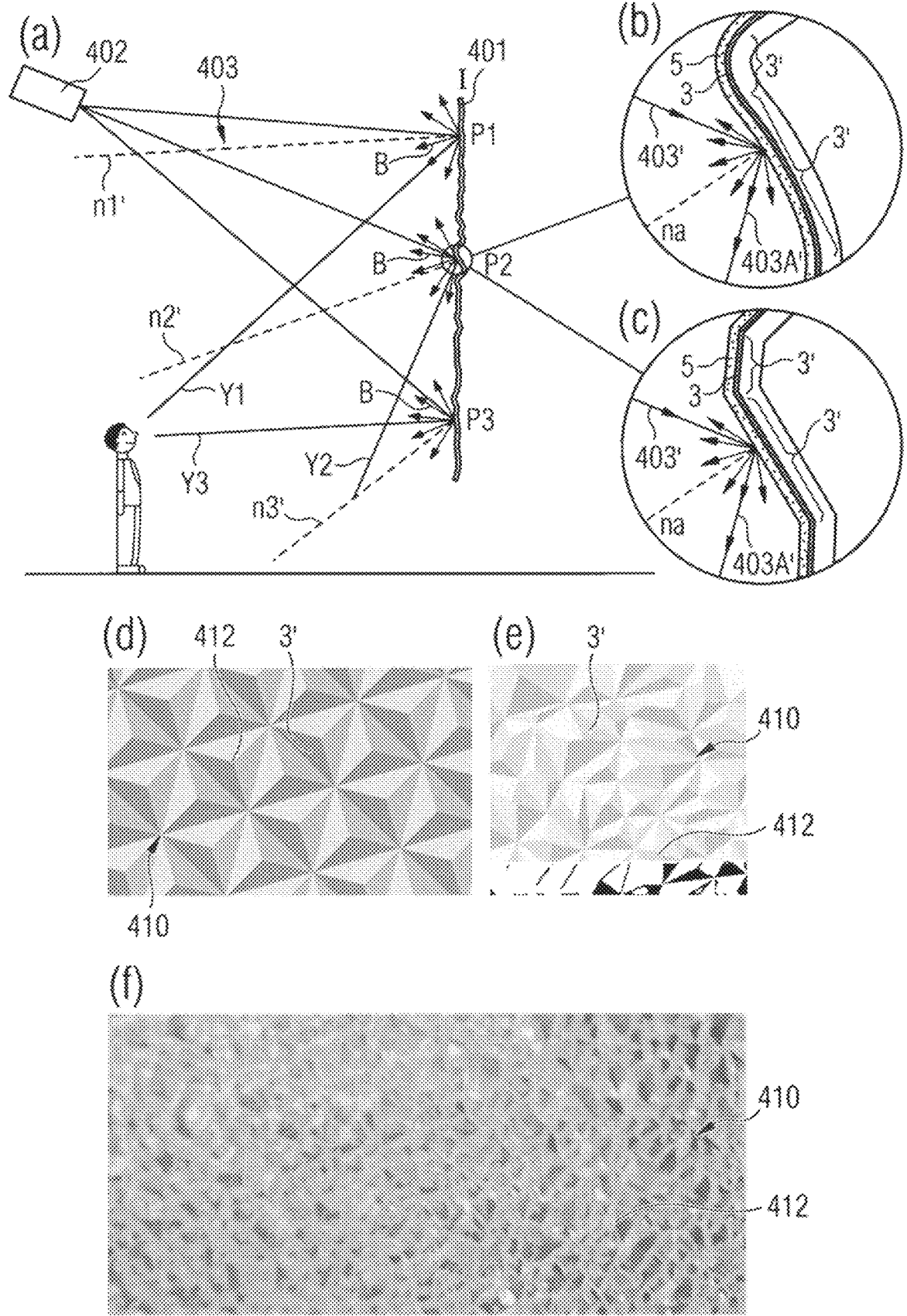
FIG. 27 is an illustration of an illumination system using a chromatic reflective unit having small scale random-like oriented reflective surface sections including exemplary surface structures.

FIG. 27 does exemplarily show embodiments for such a sun-like blinking perception for a chromatic reflective unit having non-coplanar reflective surface sections. In FIG. 27(a), an observer looks at a chromatic reflective unit 401 that is illuminated by a light source 402. Specifically, light source 402 emits a light beam 403 having, for example, an angular divergence in the range up to 80°, such as in a range up to 60°, or a range up to 40° or less.

Chromatic reflective unit 401 may be configured so that the non-coplanar reflective sections 3' are connected and form a continuous coarse grain surface 410. Exemplary cut-views of coarse grain surface 410 are shown in FIGS. 27(b) and 27(c) and exemplary top views are shown in FIGS. 27(d) to 27(f).

As further shown in FIG. 27(a), coarse grain surface 410 is essentially completely illuminated by light beam 403 such that the complete coarse grain surface 410 can be considered a source of Rayleigh-like scattered light B (considered to provide a blue color for a sky-like impression) as indicated for three points P1, P2, and P3 on coarse grain surface 410. Depending on the respective orientation of coarse grain surface 410, the observer may perceive, however, primarily a strong specularly reflected portion Y1, Y3 of light beam 403, e.g. indicated for points P1 and P3. For point P2, the surface is inclined such that the respective portion Y2 of light beam 403 is reflected towards the ground in front of the observer such that the observer only perceives scattered light contributions B from point P2.

The extent of bright light associated with an area on coarse grain surface 410 depends on the extent of the surface that fulfills the specular reflective conditions.

Assuming the requirement that the observer can distinguish isolated bright points from the surrounding that does not contribute to perceived specular reflection, the required size will be apparent to the skilled person as it depends on the geometry of the illumination system, in particular the distance of the observer to coarse grain surface 410. Depending on the expected distance of the observer to the chromatic reflective unit, surface sections 3' may have the size of several square millimeters or few square centimeters.

For comparison of the reflective feature of coarse grain surface 410 with a planar chromatic reflective surface, for each point P1 to P3, reflected beams n1' to n3' are indicated as dashed lines in FIG. 27(a).

Specifically, the embodiments of FIG. 27 may provide the vision of glittering light peaks (portions Y1, . . . ) based on directed light beam 403, where the glittering light peaks may alternate with sky-like fragments (scattered light B). Chromatic reflective unit 401 may be configured so that non-coplanar reflective surface sections 3' are connected and form a continuous surface.

FIG. 27(b) illustrates as a first exemplary embodiment a smooth surface providing reflective surface sections 3' that essentially fulfill similar specular reflection conditions. Exemplarily, a light beam portion 403' is indicated that is specularly reflected by a reflective surface section to form an illuminating beam portion 403A'. A respective associated normal na is illustrated for that reflective surface section.

FIG. 27(c) illustrates as a second exemplary embodiment in which the smooth surface of FIG. 27(b) is composed of essentially planar facets. The second embodiment again provides a reflective surface sections 3' that provides specular reflection conditions illustrated by an associated normal na, which in this case corresponds to the normal of the planar facet.

In general, coarse grain surface 410, specifically the continuous reflective surface, may be made of a multitude of planar or quasi-planar surface sections of various shapes and extends. The shapes and extends may be configured with higher or lower degree of regularity, order, and/or periodicity such as with a limited number of types of surface sections, shapes, or inclinations.

The continuous reflective surface may be completely (as shown in FIGS. 27(b) and 27(c)) or partially coated with a chromatic diffusing layer 5 to provide (blue) scattering at angles of observation for each single section, i.e. at angles different from the specular reflection direction of light beam 403, which is the main illumination contributions, and thus away from yellow bright luminance in the specular reflection direction. This aspect of—in 2D—mosaic like segmentation of specular reflectivity conditions in combination with the nanoparticle based Rayleigh-like scattering may provide the appearance of many glittering light peaks (beam portions Y)—which will be perceived similar to the case of sun reflected in the water—together with scattered light regions, which may be perceived as sky-like fragments. It is noted that this effect may even be increased when the reflective surface sections are configured in a partly irregular arrangement, with many different shapes, sizes and orientations and with different rays of curvatures, even the limit case of a non-regular and non-periodic sinusoidal (wave-like) profile may provide the desired effect.

FIGS. 27(d) to (f) illustrate exemplary mosaic-like surface structures 412 of continuous coarse grain surfaces 410. The plurality of mosaic-like surface structures 412 are configured to form a faceted surface and provide a plurality of facet-like surface sections for interacting with light beam 403. A correlation area of mosaic-like surface structures 412 is selected to provide for a fragmentation of the vision of the emitting area of light source 402 when seen along an optical path including continuous coarse grain surface 410 from the target illumination/observer area. The plurality of surface sections are configured to redirect incident light beam portions such that the light beam downstream the continuous coarse grain surface 410 is broadened in size—similar to line 407 of constant brightness indicated in FIG. 25. Thereby, the illuminance values on the target illumination/observer area are reduced, while redirected light beam portions exhibit local luminous peaks with a luminance comparable to the luminance of the emitting surface of light source 402.

The correlation area of the mosaic-like surface structures corresponds essentially to the average transversal size of the single mosaic-like surface structure such as one complete surface oscillation (e.g. from a deepest point to a highest point to the next deepest point on the surface). Moreover, the correlation area is essentially comparable in size to the size of the (light interacting) surface section. Accordingly, to be visually resolvable, it is in the range from, for example, about 0.5 mm to 1 m. In principle, the reflective surface section is a fraction of the correlation/transversal size (for example, half in a symmetric geometric shape or even a larger percentage depending on the inclination of the facet structure). As will be understood by the skilled person, "transversal" in this context refers to the surface-type, e.g. a plane parallel to the central plane. Correlation is a defined mathematical term (here the 2D-correlation). It is noted that in case of a non-planar surface, correlation scales larger than the section may appear (e.g. if the unit is curved or itself sinusoidal).

Referring to FIG. 27(d), continuous coarse grain surface 410 comprises several types of pyramids that are arranged to completely cover the surface in a regular arrangement. Thereby, also a set of regularly distributed and identically oriented reflective surface sections are formed.

In contrast, continuous coarse grain surface 410 shown in FIG. 27(e) comprises many more types of different geometrical shapes including inter alia pyramid-like shapes and wedge-like shapes. The geometrical shapes are mosaic-like arranged to completely cover the surface in an irregular arrangement. Thereby, also a set of irregularly distributed and differently oriented reflective surface sections are formed that in addition vary in size.

Similarly to the embodiment shown in FIG. 27€, continuous coarse grain surface 410 of FIG. 27(f) comprises various types of different shapes that are in general related to geometrical shapes but may—for example due to the processing procedure—to some extend rounded. As can be seen, the faceted structure is made of curved facets that are located either directly next to each other or are separated by some planar transition surface section. The structures have, for example, again pyramid-like shapes and wedge-like shapes. In addition, the height of the mosaic-like structure may vary more than in FIG. 27(e). Thereby, again a set of irregularly distributed and differently oriented and differently sized reflective surface sections are formed.

As a general indication, the x (or y) size of the sections, the x (or y) average size of the patches, the x (or y) local periodicity of the oscillating surface or, in general the x (or y) support structure size to support on average a single oscillation of the reflective surface (one local maxima and one local minima of the distance to a reference plane) may be configured so that, for an observer standing in the installation ambient, the individual surface sections are optically resolvable by eye in order to appreciate color and brightness variations. For indoor applications reflective sections may extend about or larger than 1 mm, such as few centimeters or even larger than 0.2 m. For outdoor applications, the surface sections may be larger than 5 mm, such as 0.3 m, or even larger than 0.5 m.

When interposed between a light source (this can be a specific light projector or also Sun or a distribution of luminance with some peaks etc.) and the observer, the chromatic reflective units based on mosaic-like surface structures provide in appearance a fragmentation (such as a partition-chopping-splitting) of the source in many smaller perceived sources with comparable (in general not significantly reduced) luminance but with significant smaller size (angular size, for a fixed observer distance from the source).

Those smaller luminance peaks are obviously distributed over a large angular range with respect to the original source angular shape.

This produces in terms of visual appearance the same perception of brightness produced by the original source (local peaks preserve the brightness level of the source) provided that the optical structures can be resolved by the observer's eye (e.g. light peaks essentially do not mix up), thereby providing, for example, of the sun being reflected in the water.

This appearance is specific and stands in contrast with a fine-structured diffuser (that would be perceived when the optical structures are not resolvable) as in that case the luminance is averaged and the high-level peaks are smoothed and significantly reduced as a result.

Referring again to FIG. 27(a), in projection the illustrated illumination system produces a broadening and a smoothing of the projected light spot obtainable from the light source without the coarse-grain frost. In other words, the in connection with FIG. 27 disclosed embodiment introduce a type of a non-absorbing Rayleigh-like scattering coarse-frost unit based on non-coplanar surface sections.

The configuration combines the chopping of luminance into small regions with diffusing the blue component as a Rayleigh diffuser.

This allows to obtain a smearing and a broadening of the direct light spot by a fragmentation of the emitting area of the source, yet each being perceived as the "sun" in terms of color and luminance though chopped in smaller sources, while the sky color may be preserved.

In some embodiments, continuous coarse grain surface 410 may be coated with a chromatic diffusing layer as disclosed herein.

While the before described embodiments were discussed for indoor illumination systems, similar outdoor configurations will be apparent to the skilled person. For example, a chromatic reflective unit may be mounted to an outside wall of a building and be illuminated by a light projector positioned on a pole or a neighboring building. For example, a sun-sky-like appearance by a respective covered wall of a building may be achieved at night.

In the following, various exemplary configurations if illumination systems are disclosed in more detail.

Figure 28:
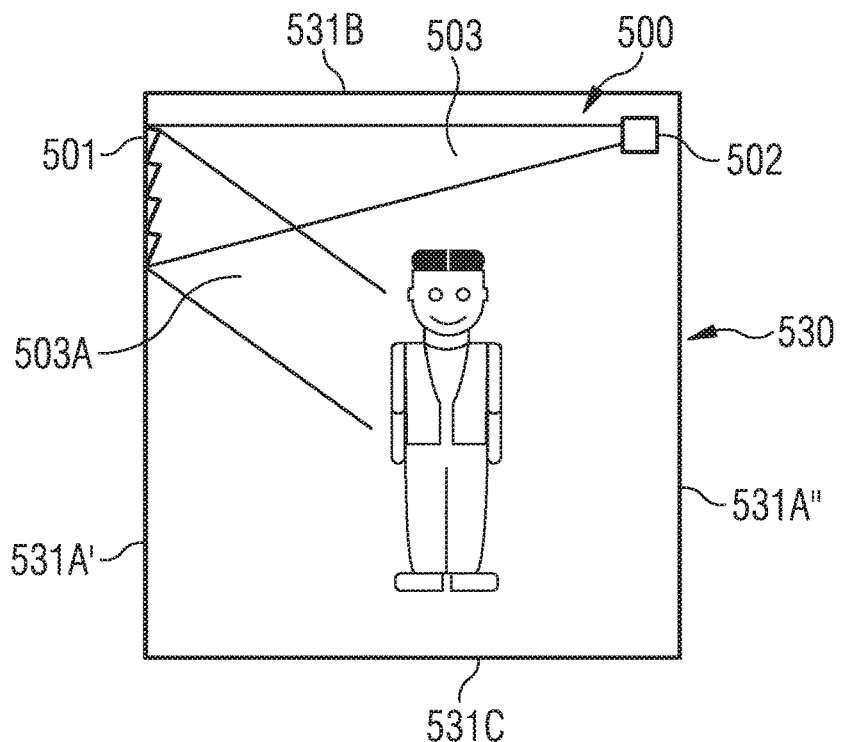
FIG. 28 is a schematic illustration of an elevator illumination concept.

FIG. 28 illustrates an exemplary indoor configuration for an illumination application of the chromatic reflective units described herein. Specifically, an elevator 530 (as an example for an indoor room) is delimited by walls 531A', 531A", a ceiling 531B, and a floor 531C and illuminated by an illumination system 500. Illumination system 500 comprises a chromatic reflective unit 501 that is mounted to wall 531A' and configured in line with the herein disclosed concepts to comprise a plurality of non-coplanar reflective surface sections. Illumination system 500 comprises further a projector 523 that is mounted to ceiling 531B or close to ceiling 531B, for example, at wall 531A" opposing chromatic reflective unit 501. Projector 523 is configured to emit a light beam 503 onto chromatic reflective unit 501. As in FIG. 21, light beam 503 may be redirected by the chromatic reflective unit 501 to fall as a reflected illuminating light beam 503A onto floor 531C.

A person within room 530, when looking at chromatic reflective unit 501 from the outside of reflected light beam 503A, sees the blueish appearing of a viewable front face 550 of chromatic reflective unit 501. The person, when being within reflected light beam 503A, sees also light of light beam 503 reflected from those reflective surface section that have the required orientation in space.

As described herein, the chromatic diffusing layer of chromatic reflective unit 501 can produce a chromatic separation (in terms of correlated color temperature CCT) of the regular (specular) reflected light of reflected light beam 503A from the scattered diffuse light. Specifically, the correlated color temperatures of the diffuse light will be larger than the correlated color temperature of the specular reflected light, for example by a factor 1.2, or 1.1, or the like. Depending on, for example, the color, shape, and homogeneity of the light emitted from projector 523, a sunlight imitating lighting system may be generated.

The various types of configurations of chromatic reflective unit 501 may allow providing an illumination system in a compact manner within elevator 530 that takes advantage of the herein disclosed sun-sky-like effects perceived by the person.

Figure 29:
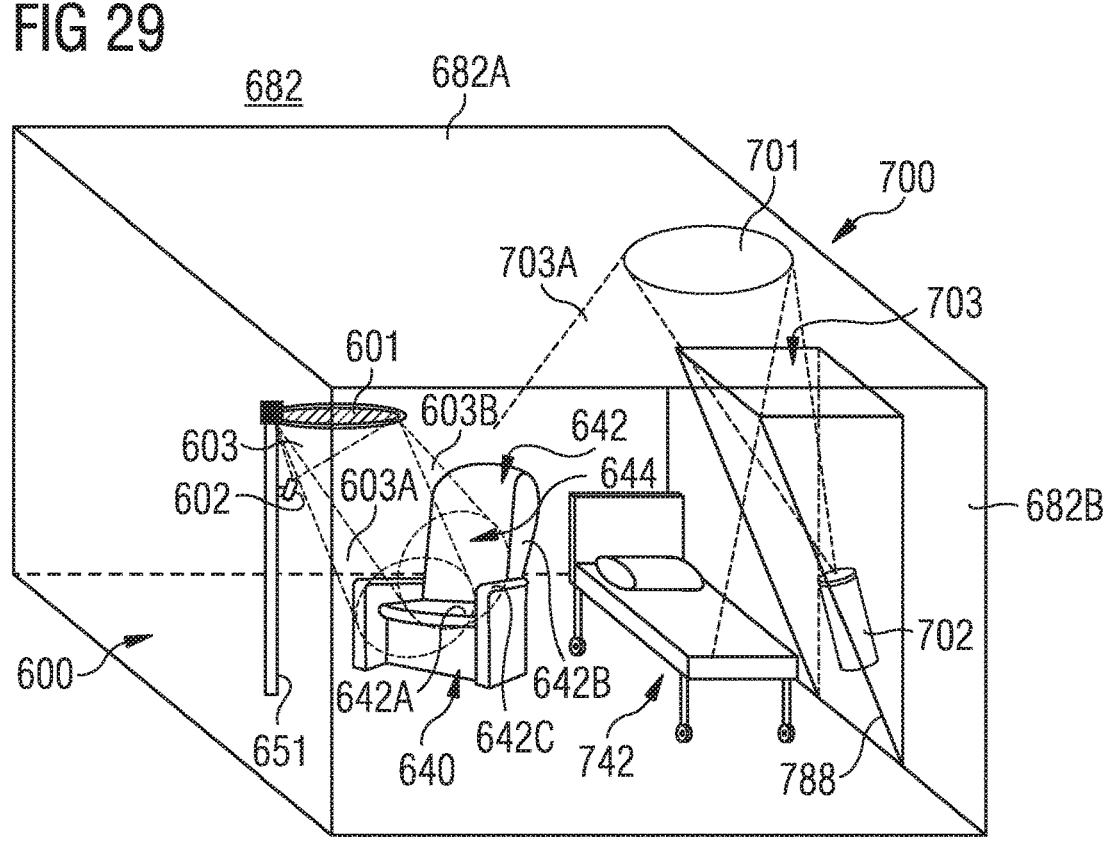
FIG. 29 is a schematic illustration of exemplary indoor installations using a reflector unit-wall integration and a lamp integration.

In FIG. 29, indoor installations of two types of illumination systems are schematically illustrated for a room 682, a local one and a room illuminating one. Specifically, a seat illumination system 600 corresponds to a seat illuminating system similar to those described in PCT/EP2015/000406, entitled "SEAT ILLUMINATIOAN SYSTEM" filed on 23 Feb. 2015 by the same applicants, the contents of which are herein incorporated in their entirety, while a room illumination system 700 allows illumination of room 682 with sun-sky-like effects disclosed herein.

Seat illuminating system 600 is generally based on the illumination systems as described herein that include a light source 602 (generating a light beam 603) and a chromatic reflective unit 601 onto which light beam 603 is directed and which reflects light beam 603, thereby forming one or more illuminating light beams 603A, 603B, those target regions could or could not overlap.

Seat illuminating systems 600 generally comprise further a seat arrangement 640, comprising at least one seat 642 with, for example, a seat surface 642A, a backrest 642B, and an armrest 642C. As further indicated in the drawings, two target region 644 extend on top of seat surface 642A and at a lower section of backrest 642B. Seat 642 may extend up to a seat height. As shown exemplarily in FIG. 29, chromatic reflective unit 601 comprises two subgroups of reflective surface sections being inclined respectively for illuminating target regions 644.

FIG. 29 illustrates exemplary a pole-like configuration of a mounting structure 650 at which light source 602 and chromatic reflective unit 601 are mounted to a pole 651.

In some embodiments, mounting structure 650 may be spatially fixed with respect to seat arrangement 640. Spatially fixed indicates in this context a rigid arrangement that essentially provides for a fixed position of target region 644 with respect to respective light source 602 and respective chromatic reflective unit 601. A controlled movement of target region 644 due to, for example, an included joint or optical adaptation is also considered to fall within the concept of a spatially fixed mounting of light source 602 and chromatic reflective unit 601 to the mounting structure.

As further indicated in FIG. 29, chromatic reflective unit 601 is mounted at a height that is higher than the seat height of seat 642, thereby providing an inclined top-down illumination of target region 644.

Within room 682, a target region may be defined as a preferred range of positions of an observer of illumination system 700. For example, the target region may relate to a person accommodation furniture being present in the room 682 such as a bed 742, hospital bed, seat, couch, or chair. In some embodiments, the target region may relate to an observer path through room 682. The illuminating light beam is directed to illuminate the target region. In some embodiments, such as in a hospital environment, the illumination system may be specifically controllable to illuminate the target region in a sun-imitating manner, for example, during the course of the day. e.g. providing incidence angles of the illuminating light beam or respective coloring of the illuminating light beam and/or luminous layer, thereby providing a day-like light/illumination pattern for patients, which may provide optimal awakening conditions and other benefits of the life rhythm.

As shown in FIG. 29, room 682 comprises a ceiling 682A and four walls. In general, illumination system 700 provides for a drop-down illumination within room 682. Illumination system 700 comprises a light source 702 mounted within room 682. For example, light source 162 is mounted at a wall 682B and emits a light beam 603 directed upwards onto a chromatic reflective unit 701 mounted at ceiling 782A.

Observers within room 682 will again primarily see a diffuse light component when looking at reflector unit 601 and a directed light component when being within the range of sun-perception positions.

Furthermore, a screen structure 788 may be provided to at least initially hide light source 702 when guiding light beam 703 towards chromatic reflective unit 701. In addition, screen structure 788 may reduce the possibility of a person within room 682 to interfere with (e.g. reach into) light beam 703 and, thereby, to affect the perception of chromatic reflective unit 701. Screen structure 788 could be a transparent (e.g. glass) cover or theca (even completely closed on all sides) to prevent people intrusion into light beam 703.

In alternative embodiments, light source 702 may be provided behind wall 682B and wall 682B may comprise an opening, for example covered by an anti-reflective coated glass window. The light of the source would then pass through the glass window and fall onto chromatic reflective unit 701 thereby being reflected into room 682.

As further schematically illustrated in FIG. 11A, a screen structure 688 covers glass window 684 and comprises an opening in direction of reflector unit 606 such that light beam 603 can pass along and within screen structure 688, thereby further hiding the optical configuration of light source 602 and glass window 684 from observer 686.

Light source 802 may be positioned, for example, in between driver seat 842A and co-driver seat 842B. In some embodiments, the light source may be mounted next to headrests 843A to 843C or to ceiling 854.

A light beam 803 emitted from light source 802 illuminates chromatic reflective unit 801 from down to top, thus against ceiling 854. Ceiling 854 accordingly functions as a beam block such that even for some small scale misalignment of light beam 803, no light will leave the inner of passenger car.

Moreover, as will be apparent to the skilled person, light beam 803 will be provided essentially in sections of the interior of car in which a passenger's head usually will not be present, thereby avoiding potential interference of the passenger with light beam 803. In addition, rear seat illuminating system 800 may comprise volumetric motion sensors to avoid operation of light source 802 when something, for example a head of a passenger, enters the space occupied by light beam 803.

In some embodiments, chromatic reflective unit 801 may be combined with a conventional sunroof installation, for example being retractable into a hidden position. For example, chromatic reflective unit 801 may be shaped to follow the curvature dictated by the respective sunroof configuration. Chromatic reflective unit 801 may be in the hidden position, in case the real sunroof is opened or, generally, in case no sunlight imitation is needed. In an extracted position, chromatic reflective unit 801 may be positioned before the conventional sunroof.

After the reflection from reflector unit 801, an illuminating light beam 803A propagates from reflector unit 801 down to a seat bench surface 842, on top of which a target area 844 is defined.

The reflective surface sections of the chromatic reflective unit 801 are inclined with respect to ceiling 854 of the passenger car and, thus, allow a compact configuration of illumination system 800.

Moreover, using multiple subgroups of reflective surface sections with respective orientations (respective inclination angles regarding ceiling 854 may allow further providing passenger specific illumination areas 844A, 844B, 844C on surface 842 of rear seat bench 842C.

Similar to the exemplary ceiling configuration of FIGS. 30(a) and 30(b), in general, chromatic reflective surface sections may be provided at inside wall segments of transportation units such as side walls floors and ceilings. The respective wall segment may be associated with a normal direction. The normal direction may be constant or vary of along the inside wall segment. The herein disclosed chromatic reflective surface sections are based on non-coplanar reflective surface sections that are in particular inclined with respect to the normal of respective portions of the inside wall element.

As a further example, FIG. 31 illustrates a seat illuminating system 900 for conventional cabin layouts as used, for example, in trains and airplanes.

In a cabin 952 shown in FIG. 31, an exemplarily pair of two seats 942 is mounted next to a sidewall 954. Sidewall 954 may have window openings 955 arranged therein and associated with seats 942.

A luggage storage chamber 956 extends overhead along sidewall 954, thereby forming part of the inner wall segment, specifically of the roof structure of cabin 952 in the area of seat 942.

Seat illuminating system 900 comprises a chromatic reflective unit 901 and a light source 902.

As shown in FIG. 10, light source 902 is provided at a mounting structure 950 integrated into sidewall 954. Chromatic reflective unit 901 is integrated in a bottom part of an overhead storage chamber 956. Accordingly, chromatic reflective unit 901 is illuminated from down to top and reflects a light beam 903 emitted from light source 902 as respective illuminating light beams 903A, 903B down to target areas 944A and 944B. Target areas 944A, 944B may, for example, be the reading areas associated with seats 942. The respective light beam paths usually do not interfere with a passenger's head.

In some embodiments, chromatic reflective unit 901 may be to some extent be movably mounted, thereby allowing setting illuminating light beams 903A, 903B as desired.

In alternative embodiments, chromatic reflective unit 901 may resemble to some extent a window of cabin 1152 and be provided at sidewall 954 of cabin 952 or in a transition area (not shown) between sidewall 954 and a face of a luggage storage chamber 956.

As additional security measures, screen structure may be provided that at least initially cover light beam 903, thereby reducing the possibility of a person to interfere with (e.g. reach into) light beam 903 and, thereby, to affect the perception of chromatic reflective unit 901.

As will be apparent to the skilled person, the shape of the reflector unit may be adapted to the shape of the inner walls of the cabin.

A further application of the illuminating concepts as disclosed herein is shown in FIGS. 32(*a*) and 32(*b*) for a mixed indoor/outdoor surrounding. Specifically, an illumination system 1000 for illuminating an automobile tunnel 1052 is illustrated in a cross-sectional view. Illumination system 1000 is configured to provide a driver of a car in particular with an alerting illumination condition.

Illumination system 1000 includes a chromatic reflective unit 1001 mounted to a ceiling 1054 of tunnel 1052 and a light source 1002 for illuminating chromatic reflective unit 1001 with a light beam 1003.

Illuminating chromatic reflective unit 1001 may provide on ceiling 1054 the natural blueish sky-like illumination generated by the chromatic diffusing layer. In addition, chromatic reflective unit 1001 comprises a plurality of reflective surface sections that are inclined with respect to ceiling 1054 as well as the propagation direction of light beam 1003. Thereby, redirected tunnel illuminating beam portions 1003A, 1003B are generated that result in bright spots 1007A, 1007B, for example on driving lanes 1080A, 1080B. Thus, besides the blue ceiling region, a driver sees brightly illuminated areas wherever illuminating beams 1003A, 1003B fall onto.

The direction of illuminating beams 1003A, 1003B may be selected such that a driver of a car—when passing through the set of beam portions 103A, 103B and looking forward—can in principle see into the small sun-like beams (and in fact see directed sunrays). This is indicated in FIG. 32(*a*) for both cars, which drive "against" the beam direction. Accordingly, in FIG. 32(*b*), bright spots 1007A, 1007B are accordingly located at lanes 1080A, 1080B, respectively. As a result, the driver will experience some glare caused by illuminating light beams 1003A, 1003B, however, that glare is only limited in space and, thus, due to the driving speed in time.

In alternative embodiments, illuminating beams 1003A, 1003B may be selected such that a driver of a car—when passing through the set of beam portions 103A, 103B and looking forward—cannot see into the small sun-like beams as the beams illuminate the car from the back. This is indicated in FIG. 32(*b*) exemplarily by bright spots 1007C on lane 1080B.

As a result, illumination system 1000 can provide an illumination region within automobile tunnel 1052 that is characterized by an increased contrast due to the sun-like illumination. Thereby, the awareness of drivers and/or the adaptation of the eyes of a driver when approaching an exit of tunnel 1052 or shortly after having entered tunnel 1052 may be improved.

As shown in FIG. 32(*b*), the flexibility given by the non-coplanar reflective surface sections allows illuminating neighboring driving lanes by a single tunnel illumination system based on various propagation directions of illumination beam portions 1003A, 1003B. In general, inclination angles for the reflective surface sections with respect to ceiling 1054 may be, for example, in the range from 10° to 80°, thereby allowing a propagation direction of the illuminating beam portions with respect to the ground in the range from 70° via vertical incidence up to −70° (for vertical propagation of light beam 1003). In FIG. 32(*a*), the angle between the normal of the reflective surface sections and the normal of the tunnel ceiling is about 30° for beam portions 1003A and about 67.5° for beam portions 1003B, resulting in incident angles of about 30° for beam portions 1003A and about −45° for beam portions 1003B, respectively.

Although exemplary embodiments of this invention have been described herein, embodiments may be combined in one illumination system such as combining on a chromatic reflective unit random and plan-parallel reflective surface sections.

Although the preferred embodiments of this invention have been described herein, improvements and modifications may be incorporated without departing from the scope of the following claims.

The invention claimed is:

1. An illumination system comprising:
 a light source configured to generate a light beam; and
 a chromatic reflective unit configured to be illuminated by the light beam, the chromatic reflective unit comprising
  a plurality of non-coplanar reflective surface sections, and
  a chromatic diffusing layer comprising a plurality of nanoparticles embedded in a matrix, wherein the chromatic diffusing layer is provided upstream of the plurality of reflective surface sections such that at least a portion of the light beam passes through the chromatic diffusing layer before and after being reflected by the plurality of non-coplanar reflective surface sections, and wherein the plurality of non-coplanar reflective surface sections and the chromatic diffusing layer are configured to provide a specular reflectance that is larger for wavelengths in a red portion of the visible light spectrum than for wavelengths in a blue portion of the visible light spectrum, and a diffuse reflectance that is larger for wavelengths in the blue portion than for wavelengths in the red portion.

2. The illumination system of claim 1, wherein at least a subgroup of the reflective surface sections of the plurality of non-coplanar reflective surface sections has essentially an identical shape and an identical orientation in space, thereby forming an illuminating light beam, and wherein the subgroup of the reflective surface sections has a shape that is associated with a section normal, wherein the section normal is inclined with respect to a unit normal that is associated with a respective portion of a surface-type of the chromatic reflective unit, and is inclined by an angle in a range from about 2° to about 88°.

3. The illumination system of claim 1, wherein reflective surface sections of at least a subgroup of the reflective surface sections of the plurality of non-coplanar reflective surface sections are oriented with respect to each other in a random manner.

4. The illumination system of claim 1, wherein the light source and at least a subgroup of the reflective surface sections of the plurality of non-coplanar reflective surface sections are arranged with respect to each other such that an incident angle of the light beam onto the respective reflective surface sections is, for a given inclination direction (x, y), in a range from about 2° to about 88°, and
wherein the incident angle of the light beam is measured with respect to a section normal associated with a shape of the respective reflective surface section.

5. The illumination system of claim 1, wherein the chromatic reflective unit comprises a planar surface-type associated with a planar viewable face, and at least a subgroup of the reflective surface sections of the plurality of non-coplanar reflective surface sections has a rectangular shape with a width in a width direction (w) that extends along the viewable face and a height in a height direction (h) that extends in a direction that provides for an incident angle with respect to the light beam in a range from 2° to 88° or for an inclination angle with respect to the planar viewable face in a range from 2° to 88°.

6. The illumination system of claim 1, wherein the reflective surface sections of the plurality of reflective surface sections are oriented with respect to each other to form a step arrangement of reflective surface sections.

7. The illumination system of claim 1, wherein the chromatic reflective unit further comprises
a support structure having a plurality of non-coplanar surface sections forming a basis of a form and orientation of the reflective surface sections, and
a reflective layer formed on the plurality of non-coplanar surface sections, thereby forming the plurality of non-coplanar reflective surface sections, respectively associated with one of the plurality of non-coplanar surface sections.

8. The illumination system of claim 1, wherein the chromatic reflective unit further comprises:
a sequence of mirror units, each mirror unit comprising a reflective surface section of the plurality of reflective surface sections, and a chromatic diffusing layer section of the chromatic diffusing layer that is formed on the reflective surface section of the respective mirror unit, and
a mounting structure for mounting the mirror units under respective incident angles with respect to the light beam or under respective inclination angles with respect to a surface-type of the chromatic reflective unit.

9. The illumination system of claim 1, wherein a difference in a refractive index of the nanoparticles with respect to a refractive index of the matrix, a size distribution of the nanoparticles, and a number of nanoparticles per unit surface area are selected to provide the specular reflectance to be larger for wavelengths in the red portion than for wavelengths in the blue portion and the diffuse reflectance to be larger for wavelengths in the blue portion than for wavelengths in the red portion, and
wherein differences in the specular reflectance and the diffuse reflectance are given as average values with respect to the blue portion and the red portion in the visible light spectrum, wherein the blue portion is in a spectral range from 450 nm to 500 nm and the red portion is in a spectral range from 620 nm to 670 nm.

10. The illumination system of claim 1, wherein the nanoparticles contributing to differences in the specular reflectance and the diffuse reflectance and the matrix are essentially non-absorbing.

11. The illuminating system of claim 1, further comprising
a volumetric-motion sensor configured to detect an intrusion of people inside a volume surrounding the light beam upstream the chromatic reflective unit, and
a control unit configured to receive a respective signal from the volumetric-motion sensor and configured to dim or to switch-off any light emission from the light source in case of an intrusion detection.

12. An illumination system comprising:
a light source configured to emit at least one light beam including directed light from a respective emitting surface, wherein the at least one light beam has an angular divergence in a range up to 80°;
a chromatic diffusing layer comprising a plurality of nanoparticles embedded in a matrix, wherein the chromatic diffusing layer is provided within the at least one light beam such that at least a portion of the light beam passes through the chromatic diffusing layer, and is configured to emit diffuse light derived from the light beam; and
a continuous coarse grain surface comprising a plurality of mosaic surface structures configured to provide a plurality of surface sections for interacting with the light beam,
wherein
the illumination system is configured to provide for perception of directed light of the light beam and the diffuse light propagating to a target illumination/observer area,
a correlation area of the mosaic surface structures is selected to provide a fragmentation of a vision of the light source emitting area when seen along an optical path including the continuous coarse grain surface from the target illumination/observer area, and
the plurality of surface sections are configured to redirect incident light beam portions such that
the light beam downstream the continuous coarse grain surface is broadened in size,
illuminance values on the target illumination/observer area are reduced, redirected light beam portions exhibit local luminous peaks with a luminance comparable to a luminance of the emitting surface, and
scattered light is perceived around redirected light beam portions.

13. The illumination system of claim 12, wherein the chromatic diffusing layer of the illumination system is configured such that scattered light is perceived as blue sky.

14. The illumination system of claim 12, wherein the continuous coarse grain surface comprises a plurality of mosaic surface structures configured to provide a plurality of surface sections.

15. The illumination system of claim 12, wherein the correlation area of the mosaic surface structures is in a range from about 0.5 mm to 1 m.

16. The illumination system of claim 12, wherein a depth of the mosaic surface structures is comparable to the correlation area.

17. The illumination system of claim 12, wherein each surface section is geometrically configured to optically redirect a light beam portion impinging on it to an average output direction that at least differs or is completely independent on an average direction of redirection of at least one nearest adjacent surface section.

18. The illumination system of claim 12, wherein the mosaic surface structures comprise faceted structures based on geometric shapes, wherein the faceted structures extend from or reach into the continuous coarse grain surface.

19. The illumination system of claim 18,
wherein the faceted structures comprise at least one of rounded transitions of adjacent facets and curved facet surfaces.

20. The illumination system of claim 12, wherein the chromatic diffusing layer forms the continuous coarse grain surface on at least one surface side.

21. The illumination system of claim 12, further comprising a support structure that forms the continuous coarse grain surface on at least one surface side.

22. The illumination system of claim 12, further comprising a reflective layer provided on the continuous coarse grain surface.

23. The illumination system of claim 12, wherein a reflective layer provided on the continuous coarse grain surface and the chromatic diffusing layer provided on the reflective layer form a chromatic reflective unit.

24. The illumination system of claim 3, wherein the random orientation includes a random inclination in one or two inclination directions.

25. The illumination system of claim 3, wherein reflective surface sections of the subgroup have shapes that are associated with section normals, wherein the section normals are inclined with respect to a unit normal that is associated with a respective portion of a surface-type of the chromatic reflective unit by inclination angles that, for a given inclination direction, are within an angular range up to about 30° about a subgroup orientation direction associated with an average of the inclination directions of the subgroup.

26. The illumination system of claim 1, wherein the chromatic reflective unit comprises a support structure configured as a chromatic diffusing layer having a back side comprising a plurality of non-coplanar surface sections and a front side configured to be illuminated by incident light; and
a reflective layer formed on the plurality of non-coplanar surface sections of the back side, thereby forming the plurality of non-coplanar reflective surface sections, respectively associated with one of the plurality of non-coplanar surface sections.

27. The illumination system of claim 26, wherein a shape of the plurality of non-coplanar reflective surface sections is imprinted onto the support structure; and
the support structure is made of a material selected from the group consisting of: glass, a sandwich structure, polymethylmethacrylate, and a metal.

28. The illumination system of claim 26, wherein the support structure has applied thereon or integrated therein at least one of the reflective layer and the chromatic diffusing layer.

29. The illumination system of claim 1, wherein the chromatic diffusing layer further comprises at least one of:
particles contributing to absorption of light in a spectral range that is at least one of:
a limited range in an infrared spectrum,
a limited range in an ultraviolet spectrum, and
a specific spectral range for superimposing a coloring to an appearance of the chromatic reflective unit, and
particles having a size larger than the nanoparticles and contributing to an increase forward scattering.

* * * * *